US008326819B2

(12) United States Patent
Indeck et al.

(10) Patent No.: US 8,326,819 B2
(45) Date of Patent: Dec. 4, 2012

(54) METHOD AND SYSTEM FOR HIGH PERFORMANCE DATA METATAGGING AND DATA INDEXING USING COPROCESSORS

(75) Inventors: Ronald S. Indeck, St. Louis, MO (US); Naveen Singla, St. Louis, MO (US); David E. Taylor, St. Louis, MO (US)

(73) Assignee: Exegy Incorporated, St. Louis, MO (US)

( * ) Notice: Subject to any disclaimer, the term of this patent is extended or adjusted under 35 U.S.C. 154(b) by 0 days.

(21) Appl. No.: 11/938,732

(22) Filed: Nov. 12, 2007

(65) Prior Publication Data

US 2008/0114725 A1 May 15, 2008

Related U.S. Application Data

(60) Provisional application No. 60/865,629, filed on Nov. 13, 2006.

(51) Int. Cl.
*G06F 17/30* (2006.01)

(52) U.S. Cl. ........ 707/711; 707/696; 707/741; 707/749; 707/755

(58) Field of Classification Search .................. 707/1, 2, 707/3, 100, 102, 200, 705, 711, 712, 741, 707/749, 755, 764, 776, 696; 709/231
See application file for complete search history.

(56) References Cited

U.S. PATENT DOCUMENTS

| | | | |
|---|---|---|---|
| 3,601,808 A | 8/1971 | Vlack | |
| 3,611,314 A | 10/1971 | Pritchard, Jr. et al. | |
| 3,729,712 A | 4/1973 | Glassman | |
| 3,824,375 A | 7/1974 | Gross et al. | |
| 3,848,235 A | 11/1974 | Lewis et al. | |
| 3,906,455 A | 9/1975 | Houston et al. | |
| 4,081,607 A | 3/1978 | Vitols et al. | |
| 4,298,898 A | 11/1981 | Cardot | |
| 4,314,356 A | 2/1982 | Scarbrough | |
| 4,385,393 A | 5/1983 | Chaure et al. | |
| 4,464,718 A | 8/1984 | Dixon et al. | |
| 4,550,436 A | 10/1985 | Freeman et al. | |
| 4,823,306 A | 4/1989 | Barbic et al. | |
| 4,941,178 A | 7/1990 | Chuang | |

(Continued)

FOREIGN PATENT DOCUMENTS

EP 0573991 12/1993

(Continued)

OTHER PUBLICATIONS

Kulig et al., "System and Method for Controlling Transmission of Data Packets Over an Information Network", pending U.S. Patent Application.

(Continued)

*Primary Examiner* — Dangelino Gortayo
(74) *Attorney, Agent, or Firm* — Thompson Coburn LLP

(57) ABSTRACT

Disclosed herein is a method and system for hardware-accelerating the generation of metadata for a data stream using a coprocessor. Using these techniques, data can be richly indexed, classified, and clustered at high speeds. Reconfigurable logic such a field programmable gate arrays (FPGAs) can be used by the coprocessor for this hardware acceleration. Techniques such as exact matching, approximate matching, and regular expression pattern matching can be employed by the coprocessor to generate desired metadata for the data stream.

14 Claims, 22 Drawing Sheets

U.S. PATENT DOCUMENTS

| | | | |
|---|---|---|---|
| 5,023,910 A | 6/1991 | Thomson |
| 5,050,075 A | 9/1991 | Herman et al. |
| 5,101,424 A | 3/1992 | Clayton et al. |
| 5,140,692 A | 8/1992 | Morita et al. |
| 5,163,131 A | 11/1992 | Row et al. |
| 5,179,626 A | 1/1993 | Thomson |
| 5,226,165 A | 7/1993 | Martin et al. |
| 5,243,655 A | 9/1993 | Wang |
| 5,249,292 A | 9/1993 | Chiappa |
| 5,255,136 A | 10/1993 | Machado et al. |
| 5,265,065 A | 11/1993 | Turtle |
| 5,319,776 A | 6/1994 | Hile et al. |
| 5,327,521 A | 7/1994 | Savic et al. |
| 5,339,411 A | 8/1994 | Heaton, Jr. |
| 5,347,634 A | 9/1994 | Herrell et al. |
| 5,371,794 A | 12/1994 | Diffie et al. |
| 5,388,259 A | 2/1995 | Fleischman et al. |
| 5,396,253 A | 3/1995 | Chia et al. |
| 5,404,411 A | 4/1995 | Banton et al. |
| 5,404,488 A | 4/1995 | Kerrigan et al. |
| 5,418,951 A | 5/1995 | Damashek |
| 5,421,028 A | 5/1995 | Swanson |
| 5,432,822 A | 7/1995 | Kaewell, Jr. |
| 5,440,723 A | 8/1995 | Arnold et al. |
| 5,461,712 A | 10/1995 | Chelstowski et al. |
| 5,463,701 A | 10/1995 | Kantner, Jr. et al. |
| 5,465,353 A | 11/1995 | Hull et al. |
| 5,481,735 A | 1/1996 | Mortensen et al. |
| 5,488,725 A | 1/1996 | Turtle et al. |
| 5,497,488 A | 3/1996 | Akizawa et al. |
| 5,517,642 A | 5/1996 | Bezek et al. |
| 5,544,352 A | 8/1996 | Egger |
| 5,546,578 A | 8/1996 | Takada et al. |
| 5,651,125 A | 7/1997 | Witt et al. |
| 5,684,980 A | 11/1997 | Casselman |
| 5,687,297 A | 11/1997 | Coonan et al. |
| 5,701,464 A | 12/1997 | Aucsmith |
| 5,704,060 A | 12/1997 | Del Monte |
| 5,721,898 A | 2/1998 | Beardsley et al. |
| 5,740,466 A | 4/1998 | Geldman et al. |
| 5,774,835 A | 6/1998 | Ozawa et al. |
| 5,774,839 A | 6/1998 | Shlomot |
| 5,781,772 A | 7/1998 | Wilkinson, III et al. |
| 5,781,921 A | 7/1998 | Nichols |
| 5,802,290 A | 9/1998 | Casselman |
| 5,805,832 A | 9/1998 | Brown et al. |
| 5,813,000 A | 9/1998 | Furlani |
| 5,819,273 A | 10/1998 | Vora et al. |
| 5,819,290 A | 10/1998 | Fujita et al. |
| 5,826,075 A | 10/1998 | Bealkowski et al. |
| 5,864,738 A | 1/1999 | Kessler et al. |
| 5,886,701 A | 3/1999 | Chauvin et al. |
| 5,913,211 A | 6/1999 | Nitta et al. |
| 5,930,753 A | 7/1999 | Potamianos et al. |
| 5,943,421 A | 8/1999 | Grabon |
| 5,943,429 A | 8/1999 | Handel et al. |
| 5,978,801 A | 11/1999 | Yuasa et al. |
| 5,991,881 A | 11/1999 | Conklin et al. |
| 5,995,963 A | 11/1999 | Nanba et al. |
| 6,023,755 A | 2/2000 | Casselman |
| 6,023,760 A | 2/2000 | Karttunen et al. |
| 6,028,939 A | 2/2000 | Yin |
| 6,044,375 A | 3/2000 | Shmueli et al. |
| 6,044,407 A | 3/2000 | Jones et al. |
| 6,058,391 A | 5/2000 | Gardner |
| 6,064,739 A | 5/2000 | Davis |
| 6,067,569 A | 5/2000 | Khaki et al. |
| 6,070,172 A | 5/2000 | Lowe |
| 6,073,160 A | 6/2000 | Grantham et al. |
| 6,105,067 A | 8/2000 | Batra |
| 6,134,551 A | 10/2000 | Aucsmith |
| 6,138,176 A | 10/2000 | McDonald et al. |
| RE36,946 E | 11/2000 | Diffie et al. |
| 6,147,976 A | 11/2000 | Shand et al. |
| 6,169,969 B1 | 1/2001 | Cohen |
| 6,175,874 B1 | 1/2001 | Imai et al. |
| 6,178,494 B1 | 1/2001 | Casselman |
| 6,185,531 B1 | 2/2001 | Schwartz et al. |
| 6,226,676 B1 | 5/2001 | Crump et al. |
| 6,236,980 B1 | 5/2001 | Reese |
| 6,279,113 B1 | 8/2001 | Vaidya |
| 6,289,440 B1 | 9/2001 | Casselman |
| 6,317,795 B1 | 11/2001 | Malkin et al. |
| 6,336,150 B1 | 1/2002 | Ellis et al. |
| 6,339,819 B1 | 1/2002 | Huppenthal et al. |
| 6,370,645 B1 | 4/2002 | Lee et al. |
| 6,377,942 B1 | 4/2002 | Hinsley et al. |
| 6,381,242 B1 | 4/2002 | Maher, III et al. |
| 6,389,532 B1 | 5/2002 | Gupta et al. |
| 6,397,259 B1 | 5/2002 | Lincke et al. |
| 6,397,335 B1 | 5/2002 | Franczek et al. |
| 6,412,000 B1 | 6/2002 | Riddle et al. |
| 6,430,272 B1 | 8/2002 | Maruyama et al. |
| 6,442,545 B1 | 8/2002 | Feldman et al. |
| 6,456,632 B1 | 9/2002 | Baum et al. |
| 6,463,474 B1 | 10/2002 | Fuh et al. |
| 6,499,107 B1 | 12/2002 | Gleichauf et al. |
| 6,535,868 B1 * | 3/2003 | Galeazzi et al. .................. 707/2 |
| 6,564,263 B1 * | 5/2003 | Bergman et al. .............. 709/231 |
| 6,578,147 B1 | 6/2003 | Shanklin et al. |
| 6,601,104 B1 | 7/2003 | Fallon |
| 6,604,158 B1 | 8/2003 | Fallon |
| 6,625,150 B1 | 9/2003 | Yu |
| 6,633,868 B1 | 10/2003 | Min et al. |
| 6,658,377 B1 | 12/2003 | Anward et al. |
| 6,658,423 B1 | 12/2003 | Pugh et al. |
| 6,691,301 B2 | 2/2004 | Bowen |
| 6,704,816 B1 | 3/2004 | Burke |
| 6,711,558 B1 | 3/2004 | Indeck et al. |
| 6,765,918 B1 | 7/2004 | Dixon et al. |
| 6,772,170 B2 | 8/2004 | Pennock et al. |
| 6,772,345 B1 | 8/2004 | Shetty |
| 6,782,394 B1 | 8/2004 | Landeck et al. |
| 6,785,677 B1 | 8/2004 | Fritchman |
| 6,804,667 B1 | 10/2004 | Martin |
| 6,807,156 B1 | 10/2004 | Veres et al. |
| 6,839,686 B1 | 1/2005 | Galant |
| 6,850,906 B1 | 2/2005 | Chadha et al. |
| 6,870,837 B2 | 3/2005 | Ho et al. |
| 6,877,044 B2 | 4/2005 | Lo et al. |
| 6,882,747 B2 | 4/2005 | Thawonmas et al. |
| 6,886,103 B1 | 4/2005 | Brustoloni et al. |
| 6,901,461 B2 | 5/2005 | Bennett |
| 6,931,408 B2 | 8/2005 | Adams et al. |
| 6,944,168 B2 | 9/2005 | Paatela et al. |
| 6,971,017 B2 | 11/2005 | Stringer et al. |
| 6,978,223 B2 | 12/2005 | Milliken |
| 6,980,976 B2 | 12/2005 | Alpha et al. |
| 6,981,054 B1 | 12/2005 | Krishna |
| 7,016,910 B2 | 3/2006 | Egilsson et al. |
| 7,016,914 B2 | 3/2006 | Nayak |
| 7,019,674 B2 | 3/2006 | Cadambi et al. |
| 7,024,408 B2 | 4/2006 | Dehlinger et al. |
| 7,028,250 B2 | 4/2006 | Ukrainczyk et al. |
| 7,046,848 B1 | 5/2006 | Olcott |
| 7,051,037 B1 | 5/2006 | Thomas et al. |
| 7,054,854 B1 | 5/2006 | Hattori et al. |
| 7,082,427 B1 | 7/2006 | Seibel et al. |
| 7,089,188 B2 | 8/2006 | Logan et al. |
| 7,092,956 B2 | 8/2006 | Ruediger |
| 7,093,023 B2 * | 8/2006 | Lockwood et al. ........... 709/231 |
| 7,096,179 B2 | 8/2006 | Zhu et al. |
| 7,106,905 B2 | 9/2006 | Simske |
| 7,113,954 B2 | 9/2006 | Vogel |
| 7,117,437 B2 | 10/2006 | Chen et al. |
| 7,120,079 B2 | 10/2006 | McCollum et al. |
| 7,120,699 B2 | 10/2006 | Stork et al. |
| 7,124,140 B2 | 10/2006 | Barton |
| 7,127,424 B2 | 10/2006 | Kemp, II et al. |
| 7,130,913 B2 | 10/2006 | Fallon |
| 7,139,743 B2 | 11/2006 | Indeck et al. |
| 7,149,715 B2 | 12/2006 | Browne et al. |
| 7,167,980 B2 | 1/2007 | Chiu |
| 7,177,833 B1 | 2/2007 | Marynowski et al. |
| 7,181,437 B2 | 2/2007 | Indeck et al. |
| 7,181,608 B2 | 2/2007 | Fallon et al. |
| 7,222,114 B1 | 5/2007 | Chan et al. |

| | | |
|---|---|---|
| 7,224,185 B2 | 5/2007 | Campbell et al. |
| 7,225,188 B1 | 5/2007 | Gai et al. |
| 7,249,118 B2 * | 7/2007 | Sandler et al. ......... 707/999.001 |
| 7,251,629 B1 | 7/2007 | Marynowski et al. |
| 7,277,887 B1 | 10/2007 | Burrows et al. |
| 7,286,564 B2 | 10/2007 | Roberts et al. |
| 7,287,037 B2 * | 10/2007 | An et al. ........................ 707/102 |
| 7,305,383 B1 | 12/2007 | Kubesh et al. |
| 7,305,391 B2 | 12/2007 | Wyschogrod et al. |
| 7,321,937 B2 | 1/2008 | Fallon |
| 7,363,277 B1 | 4/2008 | Dutta et al. |
| 7,386,564 B2 | 6/2008 | Abdo et al. |
| 7,408,932 B2 | 8/2008 | Kounavis et al. |
| 7,411,957 B2 | 8/2008 | Stacy et al. |
| 7,420,931 B2 | 9/2008 | Nanda et al. |
| 7,444,515 B2 | 10/2008 | Dharmapurikar et al. |
| 7,454,418 B1 | 11/2008 | Wang |
| 7,457,834 B2 | 11/2008 | Jung et al. |
| 7,461,064 B2 | 12/2008 | Fontoura et al. |
| 7,467,155 B2 | 12/2008 | McCool et al. |
| 7,478,431 B1 | 1/2009 | Nachenberg |
| 7,480,253 B1 | 1/2009 | Allan |
| 7,487,327 B1 | 2/2009 | Chang et al. |
| 7,496,108 B2 | 2/2009 | Biran et al. |
| 7,558,925 B2 | 7/2009 | Bouchard et al. |
| 7,565,525 B2 | 7/2009 | Vorbach et al. |
| 7,636,703 B2 | 12/2009 | Taylor |
| 7,660,793 B2 | 2/2010 | Indeck et al. |
| 7,668,849 B1 | 2/2010 | Narancic et al. |
| 7,685,121 B2 | 3/2010 | Brown et al. |
| 7,685,254 B2 | 3/2010 | Pandya |
| 7,701,945 B2 | 4/2010 | Roesch et al. |
| 7,761,459 B1 | 7/2010 | Zhang et al. |
| 7,783,862 B2 | 8/2010 | Cameron |
| 7,788,293 B2 | 8/2010 | Pasztor et al. |
| 7,805,392 B1 | 9/2010 | Steele et al. |
| 7,840,482 B2 | 11/2010 | Singla et al. |
| 7,856,545 B2 | 12/2010 | Casselman |
| 7,856,546 B2 | 12/2010 | Casselman et al. |
| 7,908,259 B2 | 3/2011 | Branscome et al. |
| 7,917,299 B2 | 3/2011 | Buhler et al. |
| 7,921,046 B2 | 4/2011 | Parsons et al. |
| 7,945,528 B2 | 5/2011 | Cytron et al. |
| 7,949,650 B2 | 5/2011 | Indeck et al. |
| 8,027,893 B1 | 9/2011 | Burrows et al. |
| 8,069,102 B2 | 11/2011 | Indeck et al. |
| 8,095,508 B2 | 1/2012 | Chamberlain et al. |
| 8,131,697 B2 | 3/2012 | Indeck et al. |
| 8,156,101 B2 | 4/2012 | Indeck et al. |
| 2001/0014093 A1 | 8/2001 | Yoda et al. |
| 2001/0047473 A1 | 11/2001 | Fallon |
| 2001/0056547 A1 | 12/2001 | Dixon |
| 2002/0010825 A1 | 1/2002 | Wilson |
| 2002/0031125 A1 | 3/2002 | Sato |
| 2002/0069370 A1 | 6/2002 | Mack |
| 2002/0069375 A1 | 6/2002 | Bowen |
| 2002/0072893 A1 | 6/2002 | Wilson |
| 2002/0095512 A1 | 7/2002 | Rana et al. |
| 2002/0100029 A1 | 7/2002 | Bowen |
| 2002/0101425 A1 | 8/2002 | Hamid |
| 2002/0103663 A1 | 8/2002 | Bankier et al. |
| 2002/0105911 A1 | 8/2002 | Pruthi et al. |
| 2002/0129140 A1 | 9/2002 | Peled et al. |
| 2002/0156998 A1 | 10/2002 | Casselman |
| 2002/0162025 A1 | 10/2002 | Sutton et al. |
| 2002/0166063 A1 | 11/2002 | Lachman et al. |
| 2002/0180742 A1 | 12/2002 | Hamid |
| 2002/0199173 A1 | 12/2002 | Bowen |
| 2003/0009693 A1 | 1/2003 | Brock et al. |
| 2003/0014521 A1 | 1/2003 | Elson et al. |
| 2003/0014662 A1 | 1/2003 | Gupta et al. |
| 2003/0018630 A1 | 1/2003 | Indeck et al. |
| 2003/0023653 A1 | 1/2003 | Dunlop et al. |
| 2003/0023876 A1 | 1/2003 | Bardsley et al. |
| 2003/0028408 A1 | 2/2003 | RuDusky |
| 2003/0028690 A1 | 2/2003 | Appleby-Alis et al. |
| 2003/0028864 A1 | 2/2003 | Bowen |
| 2003/0033234 A1 | 2/2003 | RuDusky |
| 2003/0033450 A1 | 2/2003 | Appleby-Alis |
| 2003/0033514 A1 | 2/2003 | Appleby-Allis et al. |
| 2003/0033588 A1 | 2/2003 | Alexander |
| 2003/0033594 A1 | 2/2003 | Bowen |
| 2003/0035547 A1 | 2/2003 | Newton |
| 2003/0037037 A1 | 2/2003 | Adams et al. |
| 2003/0037321 A1 | 2/2003 | Bowen |
| 2003/0041129 A1 | 2/2003 | Appleby-Allis |
| 2003/0043805 A1 | 3/2003 | Graham et al. |
| 2003/0046668 A1 | 3/2003 | Bowen |
| 2003/0051043 A1 | 3/2003 | Wyschogrod et al. |
| 2003/0055769 A1 | 3/2003 | RuDusky |
| 2003/0061409 A1 | 3/2003 | RuDusky |
| 2003/0065943 A1 | 4/2003 | Geis et al. |
| 2003/0074177 A1 | 4/2003 | Bowen |
| 2003/0074582 A1 | 4/2003 | Patel et al. |
| 2003/0079060 A1 | 4/2003 | Dunlop |
| 2003/0105620 A1 | 6/2003 | Bowen |
| 2003/0105721 A1 | 6/2003 | Ginter et al. |
| 2003/0110229 A1 | 6/2003 | Kulig et al. |
| 2003/0115485 A1 | 6/2003 | Milliken |
| 2003/0117971 A1 | 6/2003 | Aubury |
| 2003/0120460 A1 | 6/2003 | Aubury |
| 2003/0121010 A1 | 6/2003 | Aubury |
| 2003/0140337 A1 | 7/2003 | Aubury |
| 2003/0163715 A1 | 8/2003 | Wong |
| 2003/0169877 A1 | 9/2003 | Liu et al. |
| 2003/0177253 A1 | 9/2003 | Schuehler et al. |
| 2003/0184593 A1 | 10/2003 | Dunlop |
| 2003/0187662 A1 | 10/2003 | Wilson |
| 2003/0221013 A1 | 11/2003 | Lockwood et al. |
| 2004/0015502 A1 | 1/2004 | Alexander et al. |
| 2004/0019703 A1 | 1/2004 | Burton |
| 2004/0028047 A1 | 2/2004 | Hou et al. |
| 2004/0049596 A1 | 3/2004 | Schuehler et al. |
| 2004/0054924 A1 | 3/2004 | Chuah et al. |
| 2004/0064737 A1 | 4/2004 | Milliken et al. |
| 2004/0100977 A1 | 5/2004 | Suzuki et al. |
| 2004/0111632 A1 | 6/2004 | Halperin |
| 2004/0117645 A1 | 6/2004 | Okuda et al. |
| 2004/0162826 A1 | 8/2004 | Wyschogrod et al. |
| 2004/0177340 A1 | 9/2004 | Hsu et al. |
| 2004/0196905 A1 | 10/2004 | Yamane et al. |
| 2004/0205149 A1 | 10/2004 | Dillon et al. |
| 2005/0005145 A1 | 1/2005 | Teixeira |
| 2005/0086520 A1 | 4/2005 | Dharmapurikar et al. |
| 2005/0175010 A1 | 8/2005 | Wilson et al. |
| 2005/0187974 A1 | 8/2005 | Gong |
| 2005/0195832 A1 | 9/2005 | Dharmapurikar et al. |
| 2005/0229254 A1 | 10/2005 | Singh et al. |
| 2005/0283743 A1 | 12/2005 | Mulholland et al. |
| 2006/0020715 A1 | 1/2006 | Jungck |
| 2006/0031263 A1 * | 2/2006 | Arrouye et al. ............... 707/200 |
| 2006/0036693 A1 | 2/2006 | Hulten et al. |
| 2006/0047636 A1 | 3/2006 | Mohania et al. |
| 2006/0053295 A1 | 3/2006 | Madhusudan et al. |
| 2006/0059213 A1 | 3/2006 | Evoy |
| 2006/0101005 A1 | 5/2006 | Yang et al. |
| 2006/0129745 A1 * | 6/2006 | Thiel et al. .................... 711/100 |
| 2006/0198375 A1 | 9/2006 | Baik et al. |
| 2006/0242123 A1 | 10/2006 | Williams |
| 2006/0269148 A1 | 11/2006 | Farber et al. |
| 2006/0294059 A1 | 12/2006 | Chamberlain et al. |
| 2007/0011175 A1 | 1/2007 | Langseth et al. |
| 2007/0011183 A1 * | 1/2007 | Langseth et al. .............. 707/101 |
| 2007/0011317 A1 | 1/2007 | Brandyburg et al. |
| 2007/0011687 A1 | 1/2007 | Ilik et al. |
| 2007/0061594 A1 | 3/2007 | Ginter et al. |
| 2007/0067108 A1 | 3/2007 | Buhler et al. |
| 2007/0067481 A1 | 3/2007 | Sharma et al. |
| 2007/0078837 A1 | 4/2007 | Indeck et al. |
| 2007/0094199 A1 | 4/2007 | Deshpande et al. |
| 2007/0112748 A1 | 5/2007 | Angell et al. |
| 2007/0112837 A1 * | 5/2007 | Houh et al. .................... 707/102 |
| 2007/0118500 A1 | 5/2007 | Indeck et al. |
| 2007/0130140 A1 | 6/2007 | Cytron et al. |
| 2007/0156669 A1 | 7/2007 | Marchisio et al. |
| 2007/0174841 A1 | 7/2007 | Chamberlain et al. |
| 2007/0179935 A1 | 8/2007 | Lee et al. |
| 2007/0209068 A1 | 9/2007 | Ansari et al. |

| | | | |
|---|---|---|---|
| 2007/0237327 | A1 | 10/2007 | Taylor et al. |
| 2007/0244859 | A1 | 10/2007 | Trippe et al. |
| 2007/0260602 | A1 | 11/2007 | Taylor |
| 2007/0277036 | A1 | 11/2007 | Chamberlain et al. |
| 2007/0294157 | A1 | 12/2007 | Singla et al. |
| 2008/0005062 | A1* | 1/2008 | Gupta et al. ............... 707/2 |
| 2008/0021874 | A1* | 1/2008 | Dahl et al. ............... 707/3 |
| 2008/0077582 | A1 | 3/2008 | Reed |
| 2008/0082502 | A1 | 4/2008 | Gupta |
| 2008/0084573 | A1 | 4/2008 | Horowitz et al. |
| 2008/0086274 | A1 | 4/2008 | Chamberlain et al. |
| 2008/0104542 | A1 | 5/2008 | Cohen et al. |
| 2008/0109413 | A1 | 5/2008 | Indeck et al. |
| 2008/0114724 | A1 | 5/2008 | Indeck et al. |
| 2008/0114725 | A1 | 5/2008 | Indeck et al. |
| 2008/0114760 | A1 | 5/2008 | Indeck et al. |
| 2008/0126320 | A1 | 5/2008 | Indeck et al. |
| 2008/0133453 | A1 | 6/2008 | Indeck et al. |
| 2008/0133519 | A1 | 6/2008 | Indeck et al. |
| 2008/0243675 | A1 | 10/2008 | Parsons et al. |
| 2009/0262741 | A1 | 10/2009 | Jungck et al. |
| 2009/0287628 | A1 | 11/2009 | Indeck et al. |
| 2010/0094858 | A1 | 4/2010 | Indeck et al. |
| 2010/0198850 | A1 | 8/2010 | Cytron et al. |
| 2011/0040701 | A1 | 2/2011 | Singla et al. |
| 2011/0066832 | A1 | 3/2011 | Casselman et al. |
| 2011/0125960 | A1 | 5/2011 | Casselman |
| 2011/0178911 | A1 | 7/2011 | Parsons et al. |
| 2011/0178912 | A1 | 7/2011 | Parsons et al. |
| 2011/0178917 | A1 | 7/2011 | Parsons et al. |
| 2011/0178918 | A1 | 7/2011 | Parsons et al. |
| 2011/0178919 | A1 | 7/2011 | Parsons et al. |
| 2011/0178957 | A1 | 7/2011 | Parsons et al. |
| 2011/0179050 | A1 | 7/2011 | Parsons et al. |
| 2011/0184844 | A1 | 7/2011 | Parsons et al. |
| 2012/0109849 | A1 | 5/2012 | Chamberlain et al. |
| 2012/0110316 | A1 | 5/2012 | Chamberlain et al. |
| 2012/0116998 | A1 | 5/2012 | Indeck et al. |
| 2012/0130922 | A1 | 5/2012 | Indeck et al. |

FOREIGN PATENT DOCUMENTS

| | | | |
|---|---|---|---|
| EP | 0851358 | A | 7/1998 |
| EP | 0880088 | | 11/1998 |
| EP | 0887723 | | 12/1998 |
| EP | 0911738 8 | A | 4/1999 |
| JP | 02136900 | A | 5/1990 |
| JP | 03014075 | A | 1/1991 |
| JP | 5101102 | A | 4/1993 |
| JP | 09145544 | A | 6/1997 |
| JP | 2000285134 | A | 10/2000 |
| JP | 2000286715 | A | 10/2000 |
| JP | 2001357048 | A | 12/2001 |
| JP | 2002101089 | A | 4/2002 |
| JP | 2005242997 | A | 9/2005 |
| WO | 9010910 | | 9/1990 |
| WO | 9409443 | A1 | 4/1994 |
| WO | 9737735 | | 10/1997 |
| WO | 9905814 | | 2/1999 |
| WO | 0041136 | A1 | 7/2000 |
| WO | 0122425 | A | 3/2001 |
| WO | 0139577 | | 6/2001 |
| WO | 0161913 | | 8/2001 |
| WO | 0180082 | A2 | 10/2001 |
| WO | 0180558 | | 10/2001 |
| WO | 02061525 | | 8/2002 |
| WO | 02082271 | | 10/2002 |
| WO | 03100650 | | 4/2003 |
| WO | 03036845 | | 5/2003 |
| WO | 2004017604 | | 2/2004 |
| WO | 2004042560 | | 5/2004 |
| WO | 2004042561 | | 5/2004 |
| WO | 2004042562 | | 5/2004 |
| WO | 2004042574 | | 5/2004 |
| WO | 2005017708 | | 2/2005 |
| WO | 2005026925 | | 3/2005 |
| WO | 2005048134 | | 5/2005 |
| WO | 2006023948 | | 3/2006 |
| WO | 2006096324 | | 9/2006 |
| WO | 2007064685 | | 6/2007 |
| WO | 2007087507 | | 8/2007 |
| WO | 2010077829 | | 7/2010 |

OTHER PUBLICATIONS

Lancaster et al., "Acceleration of Ungapped Extension in Mercury BLAST", Seventh (7th) Workshop on Media and Streaming Processors, Nov. 12, 2005, Thirty-Eighth (38th) International Symposium on Microarchitecture (MICRO-38), Barcelona, Spain.

Lin et al., "Real-Time Image Template Matching Based on Systolic Array Processor", International Journal of Electronics; Dec. 1, 1992; pp. 1165-1176; vol. 73, No. 6; London, Great Britain.

Lockwood et al., "Field Programmable Port Extender (FPX) for Distributed Routing and Queuing", ACM International Symposium on Field Programmable Gate Arrays (FPGA 2000), Monterey, CA, Feb. 2000, pp. 1-8.

Lockwood et al., "Hello, World: A Simple Application for the Field Programmable Port Extender (FPX)", Washington University, Department of Computer Science, Technical Report WUCS-TM-00-12, Jul. 11, 2000, pp. 1-14.

Lockwood et al., "Parallel FPGA Programming over Backplane Chassis", Washington University, Department of Computer Science, Technical Report WUCS-TM-00-11, Jun. 12, 2000, pp. 1-12.

Lockwood et al., "Reprogrammable Network Packet Processing on the Field Programmable Port Extender (FPX)", ACM International Symposium on the Field Programmable Gal Arrays (FPGA 2001), Monterey, Ca, Feb. 2001, pp. 87-93.

Lockwood, "An Open Platform for Development of Network Processing Modules in Reprogrammable Hardware", IEG DesignCon 2001, Santa Clara, CA, Jan. 2001, Paper WB-19, pp. 1-10.

Lockwood, "Building Networks with Reprogrammable Hardware", Field Programmable Port Extender (FPX); Jan. 2002 Gigabit Workshop Tutorial, Washington University, St. Louis, MO, Jan. 3-4, 2002.

Lockwood, "Evolvable Internet Hardware Platforms", NASA/DoD Workshop on Evolvable Hardware (EHW '01), Long Beach, CA, Jul. 12-14, 2001, pp. 1-9.

Lockwood, "Hardware Laboratory Configuration", Field Programmable Port Extender: Jan. 2002 Gigabit Workshop Tutorial, Washington University, St. Louis, MO, Jan. 3-4, 2002.

Lockwood, "Introduction", Field Programmable Port Extender: Jan. 2002 Gigabit Workshop Tutorial, Washington University, St. Louis, MO, Jan. 3-4, 2002.

Lockwood, "Platform and Methodology for Teaching Design of Hardware Modules in Internet Routers and Firewalls", IEEE Computer Society International Conference on Microelectronic Systems Education (MSE 2001), Las Vega, NV, Jun. 17-18, 2001, pp. 56-57.

Lockwood, "Protocol Processing on the FPX", Field Programmable Port Extender: Jan. 2002 Gigabit Workshop Tutorial, Washington University, St. Louis, MO, Jan. 3-4, 2002.

Lockwood, "Simulation and Synthesis", Field Programmable Port Extender (FPX); Jan. 2002 Gigabit Workshop Tutorial, Washington University, St. Louis, MO, Jan. 3-4, 2002.

Lockwood, "Simulation of the Hello World Application for the Field-Programmable Port Extender (FPX)", Washington University, Applied Research Lab, Spring 2001 Gigabits Kits Workshop.

Mosanya et al., "A FPGA-Based Hardware Implementation of Generalized Profile Search Using Online Arithmetic", ACM/Sigda International Symposium on Field Programmable Gate Arrays (FPGA '99); Feb. 21-23, 1999; pp. 101-111; Monterey, CA, USA.

Moscola et al., "FPGrep and FPSed: Regular Expression Search and Substitution for Packet Streaming in Field Programmable Hardware", unpublished, pp. 1-19.

Moscola et al., "FPsed: A Streaming Content Search-and-Replace Module for an Internet Firewall", 11th Symposium on High Performance Interconnects (HotI), pp. 122-129, 2003.

Navarro, "A Guided Tour to Approximate String Matching", ACM Computing Surveys, vol. 33, No. 1, Mar. 2001, pp. 31-88.

Nunez et al., "The X-MatchLITE FPGA-Based Data Compressor", Euromicro Conference 1999, Proceedings, Italy, Sep. 8-10, 1999, Los Alamitos, CA, pp. 126-132.

Pramanik et al., "A Hardware Pattern Matching Algorithm on a Dataflow", Computer Journal; Jul. 1, 1985; pp. 264-269; vol. 28, No. 3; Oxford University Press, Surrey, Great Britain.

Ramakrishna et al., "A Performance Study of Hashing Functions for Hardware Applications", Int. Conf. on Computing and Information, vol. 1, No. 1, May 1994, pp. 1621-1636.

Ramakrishna et al., "Efficient Hardware Hashing Functions for High Performance Computers", IEEE Transactions on Computers, vol. 46, No. 12, Dec. 1997.

Ratha et al., "Convolution on Splash 2", Proceedings of IEEE Symposium on FPGAS for Custom Computing Machines, Apr. 19, 1995; pp. 204-213; Los Alamitos, California.

Roesch, "Snort—Lightweight Intrusion Detection for Networks", Proceedings of LISA '99: 13th Systems Administration Conference; Nov. 7-12, 1999; pp. 229-238; USENIX Association, Seattle, WA USA.

Schmit, "Incremental Reconfiguration for Pipelined Applications", Dept. of ECE, Carnegie Mellon University 1997, Pittsburgh, PA, pp. 47-55.

Shah, "Understanding Network Processors", Version 1.0, University of California-Berkeley, Sep. 4, 2001.

Shirazi et al., "Quantitative Analysis of FPGA-based Database Searching", Journal of VLSI Signal Processing Systems for Signal, Image, and Video Technology; May 2001; pp. 85-96; vol. 28, No. 1/2; Kluwer Academic Publishers; Dordrecht, NL.

Sidhu et al., "Fast Regular Expression Matching using FPGAs", IEEE Symposium on Field Programmable Custom Computing Machines (FCCM 2001), Apr. 2001.

Sidhu et al., "String Matching on Multicontext FPGAs using Self-Reconfiguration", FPGA '99: Proceedings of the 1999 ACM/SIGDA 7th International Symposium on Field Programmable Gate Arrays, Feb. 1999, pp. 217-226.

Sourdis and Pnevmatikatos, "Fast, Large-Scale String Match for a 10Gbps FPGA-based Network Intrusion Detection System", 13th International Conference on Field Programmable Logic and Applications, 2003.

Steinbach et al., "A Comparison of Document Clustering Techniques", KDD Workshop on Text Mining, 2000.

Tan and Sherwood, "A High Throughput String Matching Architecture for Intrusion Detection and Prevention", ISCA 2005: 32nd Annual International Symposium on Computer Architecture, pp. 112-122, 2005.

Taylor and Turner, "Scalable Packet Classification using Distributed Crossproducting of Field Labels", Proceedings of IEEE Infocom vol. 20, No. 1, Mar. 2005, pp. 1-12.

Taylor et al., "Generalized RAD Module Interface Specification of the Field Programmable Port Extender (FPX) Version 2", Washington University, Department of Computer Science, Technical Report, Jul. 5, 2001, pp. 1-10.

Taylor et al., "Modular Design Techniques for the FPX", Field Programmable Port Extender: Jan. 2002 Gigabit Workshop Tutorial, Washington University, St. Louis, MO, Jan. 3-4, 2002.

Taylor, "Models, Algorithms, and Architectures for Scalable Packet Classification", doctoral thesis, Department of Computer Science and Engineering, Washington University, St. Louis, MO Aug. 2004.

Uluski et al., "Characterizing Antivirus Workload Execution", SIGARCH Comput. Archit. News, vol. 33, No. 1, pp. 90-98, Mar. 2005.

Villasenor et al., "Configurable Computing Solutions for Automatic Target Recognition", FPGAS for Custom Computing Machines, 1996, Proceedings, IEEE Symposium on Napa Valley, CA; Apr. 17-19, 1996; pp. 70-79; 1996 IEEE; Napa Valley, CA, Los Alamitos, CA, USA.

Ward and Snavely, "Dynamically Reconfigurable Computing: A Novel Computation Technology with Potential to Improve National Security Capabilities by Dramatically Improving High-End Computing", May 15, 2003, A White Paper Prepared by Star Bridge Systems, Inc. [retrieved Dec. 12, 2006]. Retrieved from the Internet: <URL: http://www.starbridgesystems.com/resources/whitepapers/Dynamically%20Reconfigurable%20Computing.pdf.

Web-Pop (Professional Options Package) (www.pmpublishing.com).

Yamaguchi et al., "High Speed Homology Search with FPGAs", Proceedings Pacific Symposium on Biocomputing; Jan. 3-7, 2002; pp. 271-282; vol. 7; Online; Lihue, Hawaii, USA.

"A Reconfigurable Computing Model for Biological Research Application of Smith-Waterman Analysis to Bacterial Genomes" A White Paper Prepared by Star Bridge Systems, Inc. [retrieved Dec. 12, 2006]. Retrieved from the Internet: <URL: http://www.starbridgesystems.com/resources/whitepapers/Smith%20Waterman%20Whitepaper.pdf.

"Lucent Technologies Delivers 'PayloadPlus' Network Processors for Programmable, MultiProtocol, OC-48c Processing", Lucent Technologies Press Release, downloaded from http://www.lucent.comlpress/1000/0010320.meb.html on Mar. 21, 2002.

"Overview, Field Programmable Port Extender", Jan. 2002 Gigabit Workshop Tutorial, Washington University, St. Louis, MO, Jan. 3-4, 2002, pp. 1-4.

"Payload PlusO Agere System Interface," Agere Systems Product Brief, Jun. 2001, downloaded from Internet, Jan. 2002, pp. 1-6.

"The Field-Programmable Port Extender (FPX)", downloaded from http://www.arl.wustl.edu/arl/ in Mar. 2002.

Aldwairi et al., "Configurable String Matching Hardware for Speeding up Intrusion Detection", SIRARCH Comput. Archit. News, vol. 33, No. 1, pp. 99-107, Mar. 2005.

Anonymous, "Method for Allocating Computer Disk Space to a File of Known Size," IBM Technical Disclosure Bulletin, vol. 27, No. IOB, Mar. 1, 1985, New York.

Arnold et al., "The Splash 2 Processor and Applications", Proceedings 1993 IEEE International Conference on Computer Design: VLSI Iii Computers and Processors (ICCD '93); Oct. 3, 1993; pp. 482-485; IEEE Computer Society; Cambridge, MA USA.

Baer, "Computer Systems Architecture", Computer Science Press, Potomac, Maryland, 1980, pp. 262-265.

Baeza-Yates and Navarro, "New and Faster Filters for Multiple Approximate String Matching", Random Structures and Algorithms (RSA) vol. 20, No. 1, Jan. 2002, pp. 1-28.

Baker and Prasanna, "High-throughput Linked-Pattern Matching for Intrusion Detection Systems", ANCS 2005: Proceedings of the 2005 Symposium on Architecture for Networking and Communications Systems, pp. 193-202, ACM Press, 2005.

Barone-Adesi and Whaley, "Efficient Analytic Approximation of American Option Values" Journal of Finance, vol. 42, No. 2 (Jun. 1987), 301-320.

Behrens et al., "BLASTN Redundancy Filter in Reprogrammable Hardware," Final Project Submission, Fall 2003, Department of Computer Science and Engineering, Washington University.

Berk, "JLex: A lexical analyzer generator for JavaO", downloaded from http://www.cs.princeton.edu/~appel/modern/java/JLex/ in Jan. 2002, pp. 1-18.

Braun et al., "Layered Protocol Wrappers for Internet Packet Processing in Reconfigurable Hardware", Proceedings of Hot Interconnects 9 (HotI-9) Stanford, CA, Aug. 22-24, 2001, pp. 93-97.

Cavnar and Trenkle, "N-Gram-Based Text Categorization", Proceedings of SDAIR-94, 3rd Annual Symposium on Document Analysis and Information Retrieval, Las Vegas, pp. 161-175, 1994.

Chamberlain et al., "Achieving Real Data Throughput for an FPGA Co-Processor on Commodity Server Platforms", Proc. of 1st Workshop on Building Block Engine Architectures for Computers and Networks, Oct. 2004, Boston, MA.

Cho and Mangione-Smith, "Deep Packet Filter with Dedicated Logic and Read Only Memories", 12th Annual IEEE Symposium on Field-Programmable Custom Computing Machines, Apr. 2004.

Choi et al., "Design of a Flexible Open Platform for High Performance Active Networks", Allerton Conference, Champaign, II, 1999.

Clark and Schimmel, "Scalable Pattern Matching for High Speed Networks", Proceedings of the 12th Annual IEEE Symposium on Field-Programmable Custom Computing Machines, 2004; FCCM 2004, Apr. 20-23, 2004; pp. 249-257; IEEE Computer Society; Cambridge, MA USA.

Cloutier et al., "VIP: An FPGA-Based Processor for Image Processing and Neural Networks", Proceedings of Fifth International Conference on Microelectronics for Neural Networks, Feb. 12, 1996; pp. 330-336; Los Alarnitos, California.

Compton et al., "Reconfigurable Computing: A Survey of Systems and Software", Technical Report, Northwestern University, Dept. of ECE, 1999.

Cong et al., "An Optional Technology Mapping Algorithm for Delay Optimization in Lookup-Table Based FPGA Designs", IEE, 1992, 48-53.

Denoyer et al., "HMM-based Passage Models for Document Classification and Ranking", Proceedings of ECIR-01, 23rd European Colloquim Information Retrieval Research, Darmstatd, DE, pp. 126-135, 2001.

Dharmapurikar et al., "Deep Packet Inspection Using Parallel Bloom Filters" IEEE Micro, Jan. Feb. 2004, vol. 24, Issue: 1, pp. 52-61.

Ebeling et al., "RaPiD-Reconfigurable Pipelined Datapath", University of Washington, Dept. of Computer Science and Engineering, Sep. 23, 1996; Seattle, WA.

Franklin et al., "An Architecture for Fast Processing of Large Unstructured Data Sets." Proc. of 22nd Int'l Conf. on Computer Design, Oct. 2004, pp. 280-287.

Franklin et al., "Assisting Network Intrusion Detection with Reconfigurable Hardware", Symposium on Field-Programmable Custom Computing Machines (FCCM 2002), Apr. 2002, Napa, California.

Fu et al., "The FPX KCPSM Module: An Embedded, Reconfigurable Active Processing Module for the Field Programmable Port Extender (FPX)", Washington University, Department of Computer Science, Technical Report WUCS-01-14, Jul. 2001.

Gavrila et al., "Multi-feature Hierarchical Template Matching Using Distance Transforms", IEEE, Aug. 16-20, 1998, vol. 1, 439-444.

Gunther et al., "Assessing Document Relevance with Run-Time Reconfigurable Machines", 1996; Proceedings, IEEE Symposium on Napa Valley, CA, Apr. 17, 1996.

Gyang, "NCBI BLASTN Stage 1 in Reconfigurable Hardware," Technical Report WUCSE-2005-30, Aug. 2004, Department of Computer Science and Engineering, Washington University, St. Louis, MO.

Halaas et al., "A Recursive MISD Architecture for Pattern Matching", IEEE Transactions on Very Large Scale Integration, vol. 12, No. 7, pp. 727-734, Jul. 2004.

Hauck et al., "Software Technologies for Reconfigurable Systems", Northwestern University, Dept. of ECE, Technical Report, 1996.

Hayes, "Computer Architecture and Organization", Second Edition; 1988; pp. 448-459; McGraw-Hill, Inc.

Hezel et al., "FPGA-based Template Matching using Distance Transforms", Proceedings of the 10th Annual IEEE Symposium on Field-Programmable Custom Computing Machines (FCCM '02); Apr. 22, 2002; pp. 89-97; IEEE Computer Society, USA.

Hollaar, "Hardware Systems for Text information Retrieval", Proceedings of the Sixth Annual International ACM Sigir Conference on Research and Development in Information Retrieval; Jun. 6 8, 1983; pp. 3-9; Baltimore, Maryland, USA.

Hutchings et al., "Assisting Network Intrusion Detection with Reconfigurable Hardware", FCCM 2002: 10th Annual IEEE Symposium on Field-Programmable Custom Computing Machines, 2002.

International Search Report for PCT/US2001/011255 dated Jul. 10, 2003.

International Search Report for PCT/US2003/015638 dated May 6, 2004.

International Search Report for PCT/US2004/016021 dated Aug. 18, 2005.

International Search Report for PCT/US2004/016398 dated Apr. 12, 2005.

International Search Report for PCT/US2006/006105 dated Oct. 31, 2006.

International Search Report for PCT/US2006/045653 dated Jul. 8, 2008.

International Search Report for PCT/US2007/060835 dated Jul. 9, 2007.

International Search Report for PCT/US2007/084466 dated Jul. 23, 2008.

Invitation to Pay Additional Fees and Annex to Form PCT/ISA/206 Communication Relating to the Results of the Partial International Search for International Application No. PCT/US2003/015638 dated Feb. 3, 2004.

Jones et al., "A Probabilistic Model of Information Retrieval: Development and Comparative Experiments (Parts 1 and 2)"; Information Processing and Management, 36(6): 779-840; 2000.

Keutzer et al.; "A Survey of Programmable Platforms-Network Proc"; University of California-Berkeley, pp. 1-29.

Krishnamurthy et al.; "Biosequence Similarity Search on the Mercury System"; Proceedings of the 15th IEEE International Conference on Application-Specific Systems, Architectures, and Processors (ASAP04); Sep. 2004; pp. 365-375 (2004).

Amer-Yahia et al., "XQuery 1.0 and XPath 2.0 Full-Text 1.0", W3C Working Draft, http://www.w3.org/TR/query-full-text/, May 18, 2007—part 1.

Amer-Yahia et al., "XQuery 1.0 and XPath 2.0 Full-Text 1.0", W3C Working Draft, http://www.w3.org/TR/query-full-text/, May 18, 2007—part 2.

Amer-Yahia et al., "XQuery 1.0 and XPath 2.0 Full-Text 1.0", W3C Working Draft, http://www.w3.org/TR/query-full-text/, May 18, 2007—part 3.

Amer-Yahia et al., "XQuery 1.0 and XPath 2.0 Full-Text 1.0", W3C Working Draft, http://www.w3.org/TR/query-full-text/, May 18, 2007—part 4.

Compton et al., "Configurable Computing: A Survey of Systems and Software", Technical Report, Northwestern University, Dept. of ECE, 1999.

Forgy, "RETE: A fast algorithm for the many pattern/many object pattern matching problem", Artificial Intelligence, 19, pp. 17-37, 1982.

Guerdoux-Jamet et al., Systolic Filter for Fast DNA Similarity Search, IEEE, 1995, pp. 145-156.

Herbordt et al., "Single Pass, BLAST-Like, Approximate String Matching on FPGAs", 14th Annual IEEE Symposium on Field-Programmable Custom Computing Machines (FCCM'06), Apr. 2006, pp. 1-10, IEEE.

International Search Report for PCT/US2007/084464 dated Oct. 2, 2008.

Office Action for U.S. Appl. No. 11/938,709 dated Jan. 13, 2009.

Ratha et al., "FPGA-based coprocessor for text string extraction", IEEE, Sep. 11-13, 2000, pp. 217-221.

Roy, "A bounded search algorithm for segmented channel routing for FPGA's and associated channel architecture issues", IEEE, Nov. 11, 1993, pp. 1695-1705, vol. 12.

Schmerken, "With Hyperfeed Litigation Pending, Exegy Launches Low-Latency Ticker Plant", in Wall Street & Technology Blog, Mar. 20, 2007, pp. 1-2.

"RFC793: Transmission Control Protocol, Darpa Internet Program, Protocol Specification", Sep. 1981.

Anerousis et al., "Using the AT&T Labs PacketScope for Internet Measurement, Design, and Performance Analysis", Network and Distributed Systems Research Laboratory, AT&T Labs-Research, Florham, Park, NJ, Oct. 1997.

Artan et al., "Multi-packet Signature Detection using Prefix Bloom Filters", 2005, IEEE, pp. 1811-1816.

Baboescu et al., "Scalable Packet Classification".

Bloom, "Space/Time Trade-offs in Hash Coding With Allowable Errors", Communications of the ACM, Jul. 1970, pp. 422-426, vol. 13, No. 7, Computer Usage Company, Newton Upper Falls, Massachusetts, USA.

Chaney et al., "Design of a Gigabit ATM Switch", Washington University, St. Louis.

Cuppu and Jacob, "Organizational Design Trade-Offs at the DRAM, Memory Bus and Memory Controller Level: Initial Results," Technical Report UMB-SCA-1999-2, Univ. of Maryland Systems & Computer Architecture Group, Nov. 1999, pp. 1-10.

Dharmapurikar et al., "Deep Packet Inspection Using Parallel Bloom Filters," Symposium on High Performance Interconnects (HotI), Stanford, California, 2003, pp. 44-51.

Dharmapurikar et al., "Longest Prefix Matching Using Bloom Filters," SIGCOMM, 2003, pp. 201-212.

Dharmapurikar et al., "Robust TCP Stream Reassembly in the Presence of Adversaries", Proc. of the 14th Conference on USENIX Security Symposium—vol. 14, 16 pages, Baltimore, MD, 2005; http://www.icir.org/vern/papers/TcpReassembly/TCPReassembly.pdf.

Feldmann, "BLT: Bi-Layer Tracing of HTTP and TCP/IP", AT&T Labs-Research, Florham Park, NJ, USA.

Gupta et al., "Packet Classification on Multiple Fields", Computer Systems Laboratory, Stanford University, Stanford, CA.

Gurtov, "Effect of Delays on TCP Performance", Cellular Systems Development, Sonera Corporation.

International Search Report for PCT/US2002/033286; Jan. 22, 2003.

International Search Report for PCT/US2005/030046; Sep. 25, 2006.

Jacobson et al., "RFC 1072: TCP Extensions for Long-Delay Paths", Oct. 1988.

Jacobson et al., "tcpdump—dump traffic on a network".

Johnson et al., "Pattern Matching in Reconfigurable Logic for Packet Classification", College of Computing, Georgia Institute of Technology, Atlanta, GA.

Madhusudan, "Design of a System for Real-Time Worm Detection", Hot Interconnects, pp. 77-83, Stanford, CA, Aug. 2004, found at http://www.hoti.org/hoti12/program/papers/2004/paper4.2.pdf.

Madhusudan, "Design of a System for Real-Time Worm Detection", Master's Thesis, Washington Univ., Dept. of Computer Science and Engineering, St. Louis, MO, Aug. 2004.

Madhusudan, "Design of a System for Real-Time Worm Detection", Power Point Presentation in Support of Master's Thesis, Washington Univ., Dept. of Computer Science and Engineering, St. Louis, MO, Aug. 2004.

Mao et al., "Cluster-based Online Monitoring System of Web Traffic", Dept. of Computer Science and Technology, Tsinghua Univ., Bejing, 100084 P.R. China.

Moscola et al., "FPSed: A Streaming Content Search-And-Replace Module for an Internet Firewall", Proc. of Hot Interconnects, 11th Symposium on High Performance Interconnects, pp. 122-129, Aug. 20, 2003.

Moscola, "FPGrep and FPSed: Packet Payload Processors for Managing the Flow of Digital Content on Local Area Networks and the Internet", Master's Thesis, Sever Institute of Technology, Washington University, St. Louis, MO, Aug. 2003.

Necker et al., "TCP-Stream Reassembly and State Tracking in Hardware", School of Electrical and Computer Engineering, Georgia Institute of Technology, Atlanta, GA.

Prakash et al., "OC-3072 Packet Classification Using BDDs and Pipelined SRAMs", Department of Electrical and Computer Engineering, The University of Texas at Austin.

Roberts, "Internet Still Growing Dramatically Says Internet Founder", Press Release, Caspian Networks, Inc.—Virtual Pressroom.

Schuehler et al., "Architecture for a Hardware Based, TCP/IP Content Scanning System", IEEE Micro, 24(1):62-69, Jan.-Feb. 2004, USA.

Schuehler et al., "TCP-Splitter: A TCP/IP Flow Monitor in Reconfigurable Hardware", Hot Interconnects 10 (HotI-10), Stanford, CA, Aug. 21-23, 2002, pp. 127-131.

Shalunov et al., "Bulk TCP Use and Performance on Internet 2".

Singh et al., "The EarlyBird System for Real-Time Detection on Unknown Worms", Technical report CS2003-0761, Aug. 2003.

Taylor et al., "Dynamic Hardware Plugins (DHP): Exploiting Reconfigurable Hardware for High-Performance Programmable Routers", Computer Networks, 38(3): 295-310 (16), Feb. 21, 2002, and online at http://www.cc.gatech.edu/classes/AY2007/cs8803hpc_fall/papers/phplugins.pdf.

Waldvogel et al., "Scalable High-Speed Prefix Matching".

Weaver et al., "Very Fast Containment of Scanning Worms", Proc. USENIX Security Symposium 2004, San Diego, CA, Aug. 2004, located at http://www.icsi.berkely.edu/~nweaver/containment/containment.pdf.

Wooster et al., "HTTPDUMP Network HTTP Packet Snooper", Apr. 25, 1996.

Yan et al., "Enhancing Collaborative Spam Detection with Bloom Filters", 2006, IEEE, pp. 414-425.

"Technology Overview", downloaded from the http://www.datasearchsystems.com/tech.htm on Apr. 19, 2004.

Chamberlain et al., "The Mercury System: Embedding Computation Into Disk Drives", 7th High Performance Embedded Computing Workshop, Sep. 2003, Boston, MA.

Chamberlain et al., "The Mercury System: Exploiting Truly Fast Hardware for Data Search", Proc. of Workshop on Storage Network Architecture and Parallel I/Os, Sep. 2003, New Orleans, LA.

West et al., "An FPGA-Based Search Engine for Unstructured Database", Proc. of 2nd Workshop on Application Specific Processors, Dec. 2003, San Diego, CA.

Amanuma et al., "A FPGA Architecture for High Speed Computation", Proceedings of 60th Convention Architecture, Software Science, Engineering, Mar. 14, 2000, pp. 1-163-1-164, Information Processing Society, Japan.

Asami et al., "Improvement of DES Key Search on FPGA-Based Parallel Machine "RASH"", Proceedings of Information Processing Society, Aug. 15, 2000, pp. 50-57, vol. 41, No. SIG5 (HPS1), Japan.

Google Search Results Page for "field programmable gate array financial calculation stock market" over dates of Jan. 1, 1990-May 21, 2002, 1 page.

Sachin Tandon, "A Programmable Architecture for Real-Time Derivative Trading", Master's Thesis, University of Edinburgh, 2003.

Seki et al., "High Speed Computation of Shogi With FPGA", Proceedings of 58th Convention Architecture, Software Science, Engineering, Mar. 9, 1999, pp. 1-133-1-134.

Yoshitani et al., "Performance Evaluation of Parallel Volume Rendering Machine Re Volver/C40", Study Report of Information Processing Society, Mar. 5, 1999, pp. 79-84, vol. 99, No. 21.

Brodie et al., "Dynamic Reconfigurable Computing", in Proc. of 9th Military and Aerospace Programmable Logic Devices International Conference, Sep. 2006.

Forgy, "RETE: A Fast Algorithm for the Many Pattern/Many Object Pattern Matching Problem", Artificial Intelligence, 1982, pp. 17-37, vol. 19.

Gupta et al., "High-Speed Implementations of Rule-Based Systems," ACM Transactions on Computer Systems, May 1989, pp. 119-146, vol. 7, Issue 2.

Gupta et al., "PMM: A Parallel Architecture for Production Systems," Proceedings of the IEEE, Apr. 1992, pp. 693-696, vol. 2.

U.S. Appl. No. 61/421,545, filed Dec. 9, 2010 (Taylor et al.).

Braun et al., "Protocol Wrappers for Layered Network Packet Processing in Reconfigurable Hardware", IEEE Micro, Jan.-Feb. 2002, pp. 66-74.

Cho, "A Fast Regular Expression Indexing Engine", Proc. of 18th Int'l Conv. on Data Engineering, 2001, pp. 1-12.

Dharmapurikar et al., "Design and Implementation of a String Matching System for Network Intrusion Detection using FPGA-based Bloom Filters", Proc. of 12th Annual IEEE Symposium on Field Programmable Custom Computing Machines, 2004, pp. 1-10.

Dharmapurikar, "Fast and Scalable Pattern Matching for Content Filtering", ACM, ANCS 05, 2005, pp. 183-192.

Fernandez, "Template Matching of Binary Targets in Grey-Scale Images: A Nonparametric Approach", Pattern Recognition, 1997, pp. 1175-1182, vol. 30, No. 7.

Koloniari et al., "Content-Based Routing of Path Queries in Peer-to-Peer Systems", pp. 1-19, E. Bertino et al. (Eds.): EDBT 2004, LNCS 2992, pp. 29-47, 2004, copyright by Springer-Verlag, Germany.

Li et al., "Large-Scale IP Traceback in High-Speed Internet: Practical Techniques and Theoretical Foundation", Proceedings of the 2004 IEEE Symposium on Security and Privacy, 2004, pp. 1-15.

Niewczas et al., "A Pattern Matching Algorithm for Verification and Analysis of Very Large IC Layouts", ACM, Apr. 1998, pp. 129-134.

Notice of Allowance for U.S. Appl. No. 11/938,709 dated Aug. 27, 2009.

Nwodoh et al., "A Processing System for Real-Time Holographic Video Computation", Reconfigurable Technology: FPGAs for Computing and Application, Proceedings for the SPIE, Sep. 1999, Boston, pp. 129-140, vol. 3844.

Ramesh et al., "Automatic Selection of Tuning Parameters for Feature Extraction Sequences", IEEE, Jun. 21-23, 1994, pp. 672-677.

Notice of Allowance for U.S. Appl. No. 12/640,891 dated Nov. 9, 2011.
Search Results from IEEE Xplore for "Deterministic Finite Automaton current states", dated Dec. 28, 2010, 2 pages, "Real-Time Computation by n-Dimensional Iterative Arrays of Finite-State Machines", 1966; KASHYAP, "Syntactic Decision Rules for Recognition of Spoken Words and Phrases Using a Stochastic Automaton", 1979; Rouvellou et al., "Inference of a Probabilistic Finite State Machine from its Output", 1995; and Yi et al., "A Method of Instance Learning based on Finite-State Automaton and its Application on TCM Medical Cases", 2010, et al.
Office Action for U.S. Appl. No. 10/550,323 dated Jan. 3, 2011.
Yamaguchi et al., "An Approach for Homology Search with Reconfigurable Hardware", Google, 2001, pp. 374-375.
Tau et al., "Transit Note #114: A First Generation DPGA Implementation", Jan. 1995, 9 pages.
Celko, "Joe Celko's Data & Databases: Concepts in Practice", 1999, pp. 72-74, Morgan Kaufmann Publishers.
Gokhale et al., "Reconfigurable Computing: Accelerating Computation With Field-Programmable Gate Arrays", 2005, pp. 1-3, 7, 11-15, 39, 92-93, Springer.
Ibrahim et al., "Lecture Notes in Computer Science: Database and Expert Systems Applications", 2000, p. 769, vol. 1873, Springer.
Motwani et al., "Randomized Algorithms", 1995, pp. 215-216, Cambridge University Press.
Mueller, "Upgrading and Repairing PCs, 15th Anniversary Edition", 2004, pp. 63-66, 188, Que.
Shasha et al., "Database Tuning", 2003, pp. 280-284, Morgan Kaufmann Publishers.
Skiena et al., "Programming Challenges: The Programming Contest Training Manual", 2003, pp. 30-31, Springer.
Worboys, "GIS: A Computing Perspective", 1995, pp. 245-247, 287, Taylor & Francis Ltd.
Prosecution History for U.S. Appl. No. 11/938,709, now USPN 7,660,793, filed Nov. 12, 2007.
Prosecution History for U.S. Appl. No. 12/640,891, now USPN 8,156,101, filed Dec. 17, 2009.
U.S. Appl. No. 13/442,442, filed Apr. 9, 2012 (Indeck et al.).
Office Action for JP Application 2009-536535 dated Aug. 21, 2012.
Office Action for JP Application 2009-536536 dated Jul. 17, 2012.

* cited by examiner

| Term | Pointer(s) |
|---|---|
| 123-45-6789 | {$D_{12}, p_1$}, {$D_{4321}, p_1, p_2$} |
| 314-5832761 | {$D_{121}, p_1$} |
| Azkaban | {$D_{12}, p_1$}, {$D_{9919}, p_1, p_2$} |
| Buenos-dias | {$D_{222}, p_1, p_2$} |
| Journal | {$D_2, p_1, p_2, p_3, p_4$} |
| ⋮ | ⋮ |
| Zoloft | {$D_1, p_1$}, {$D_4, p_1$}, {$D_{11}, p_1$} |

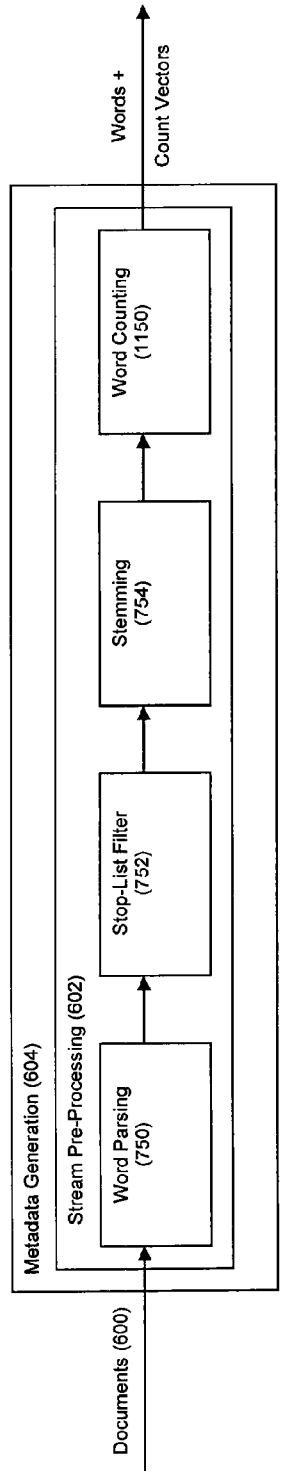

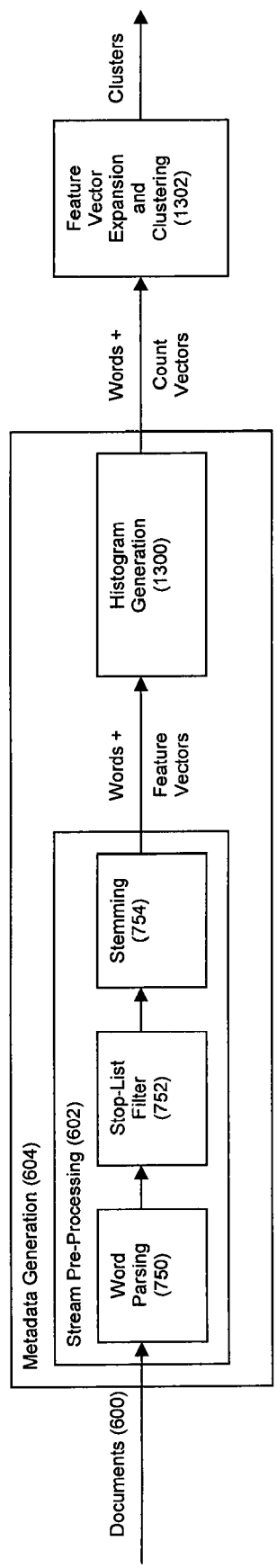
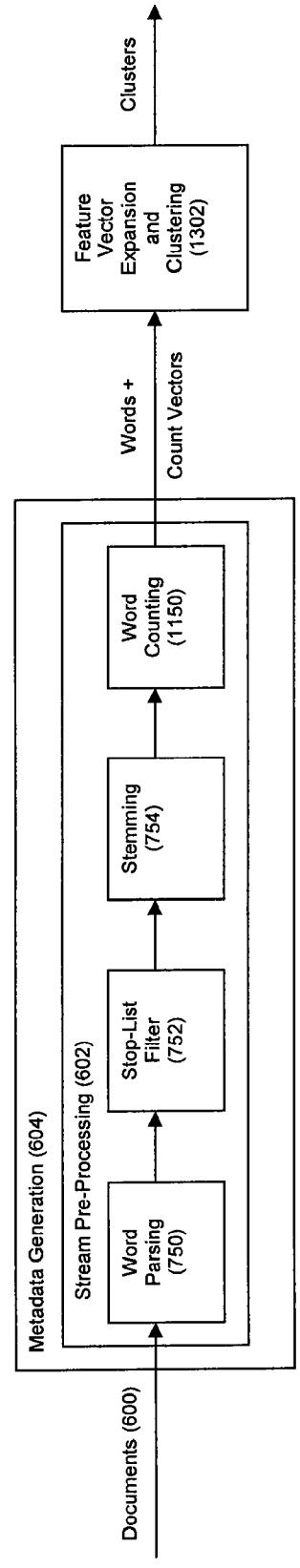
Figure 13(a)
Figure 13(b)

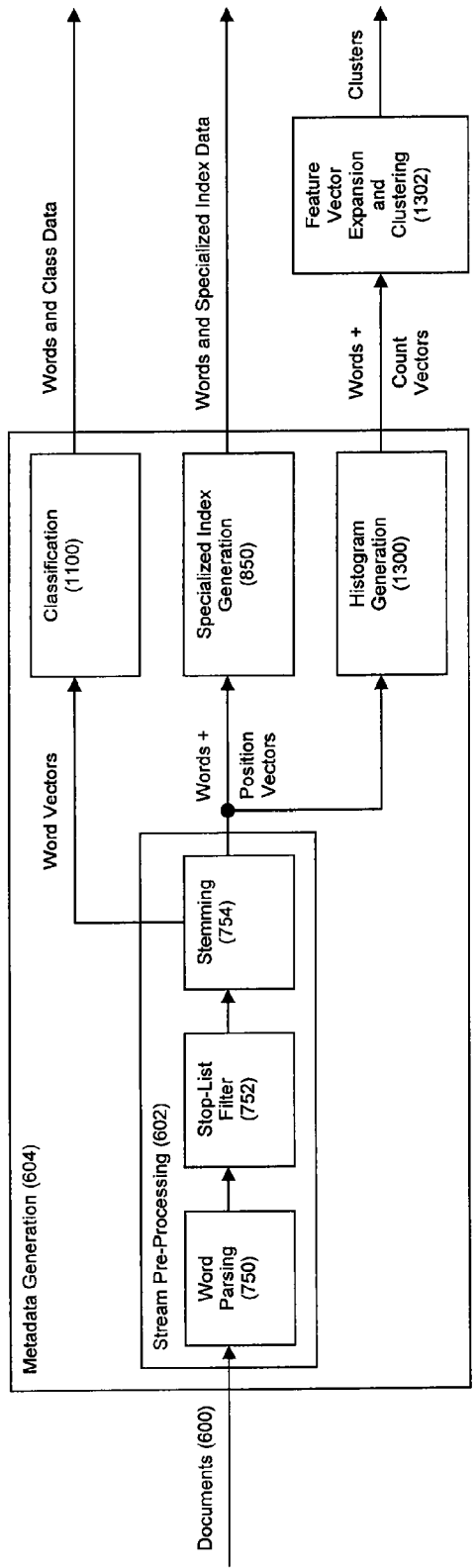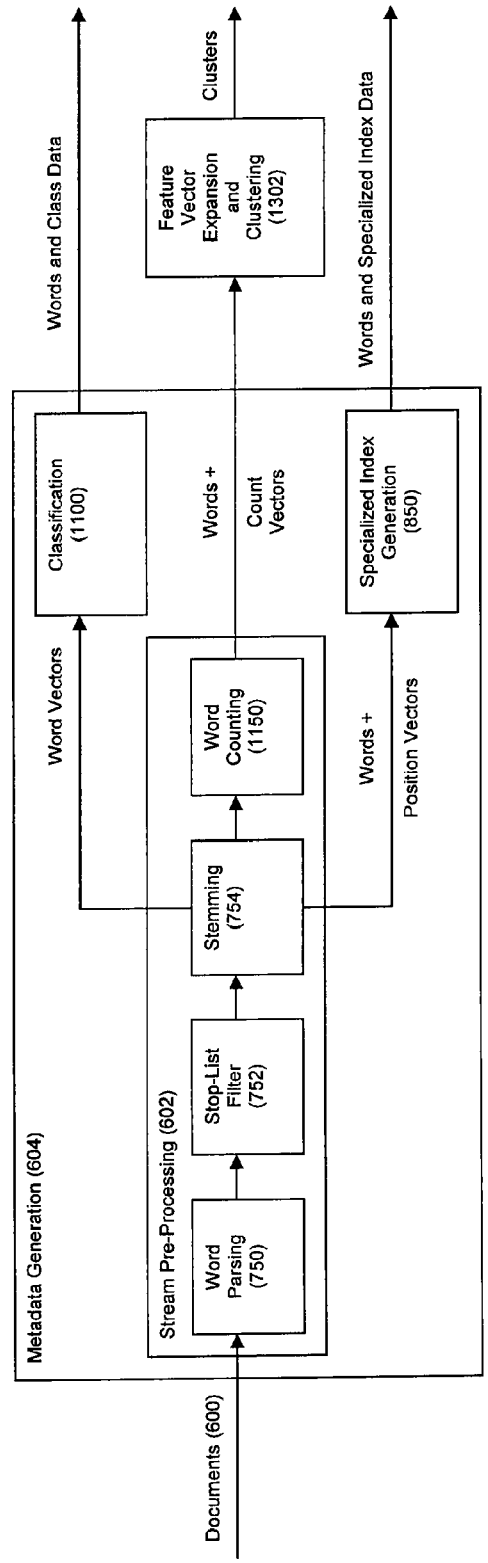
Figure 14(a)
Figure 14(b)

though the concept of "semi-structured" data with flexible schemas is emerging, particularly for XML, for present purposes everything that is not has not been normalized and persisted to a relational database will be considered unstruc-

METHOD AND SYSTEM FOR HIGH PERFORMANCE DATA METATAGGING AND DATA INDEXING USING COPROCESSORS

CROSS-REFERENCE AND PRIORITY CLAIM TO RELATED PATENT APPLICATIONS

This patent application claims priority to U.S. provisional patent application 60/865,629 filed Nov. 13, 2006, the entire disclosure of which is incorporated herein by reference.

This patent application is related to U.S. patent application Ser. No. 11/938,709, filed this same day, entitled "Method and System for High Performance Integration, Processing and Searching of Structured and Unstructured Data Using Coprocessors" and published as U.S. Patent Application Publication 2008/0114724 A1, the entire disclosure of which is incorporated herein by reference.

FIELD OF THE INVENTION

The present invention is generally directed toward the field of metadata generation and data indexing, particularly the indexing of high speed data streams.

Terminology:

The following paragraphs provide several definitions for various terms used herein. These paragraphs also provide background information relating to these terms.

GPP: As used herein, the term "general-purpose processor" (or GPP) refers to a hardware device having a fixed form and whose functionality is variable, wherein this variable functionality is defined by fetching instructions and executing those instructions (for example, an Intel Xeon processor or an AMD Opteron processor), of which a conventional central processing unit (CPU) is a common example.

Reconfigurable Logic As used herein, the term "reconfigurable logic" refers to any logic technology whose form and function can be significantly altered (i.e., reconfigured) in the field post-manufacture. This is to be contrasted with a GPP, whose function can change post-manufacture, but whose form is fixed at manufacture.

Software: As used herein, the term "software" refers to data processing functionality that is deployed on a GPP or other processing devices, wherein software cannot be used to change or define the form of the device on which it is loaded.

Firmware: As used herein, the term "firmware" refers to data processing functionality that is deployed on reconfigurable logic or other processing devices, wherein firmware may be used to change or define the form of the device on which it is loaded.

Coprocessor: As used herein, the term "coprocessor" refers to a computational engine designed to operate in conjunction with other components in a computational system having a main processor (wherein the main processor itself may comprise multiple processors such as in a multi-core processor architecture). Typically, a coprocessor is optimized to perform a specific set of tasks and is used to offload tasks from a main processor (which is typically a GPP) in order to optimize system performance. The scope of tasks performed by a coprocessor may be fixed or variable, depending on the architecture of coprocessor. Examples of fixed coprocessor architectures include Graphics Processor Units which perform a broad spectrum of tasks and floating point numeric coprocessors which perform a relatively narrow set of tasks. Examples of reconfigurable coprocessor architectures include reconfigurable logic devices such as Field Programmable Gate Arrays (FPGAs) which may be reconfigured to implement a wide variety of fixed or programmable computational engines. The functionality of a coprocessor may be defined via software and/or firmware.

Hardware Acceleration: As used herein, the term "hardware acceleration" refers to the use of software and/or firmware implemented on a coprocessor for offloading one or more processing tasks from a main processor to decrease processing latency for those tasks relative to the main processor.

Enterprise: As used herein, the term "enterprise" refers to any business organization or governmental entity that stores and/or processes data (referred to as "enterprise data") as part of its ongoing operations.

Database: As used herein, the term "database" refers to a persistent data store with indexing capabilities to expedite query processing. Various database management system (DBMS) implementations might be categorized as relational (RDBMS), object-oriented (OODBMS), hierarchical, etc.; however, the dominant architecture in today's industry is a relational, row-column, structured query language (SQL)-capable database. An ANSI-standard SQL database engine is a mature software architecture that can retrieve structured data in response to a query, usually in an efficient manner.

Structured Data As used herein, the term "structured data" refers to data that has been normalized and persisted to a relational database. Normalization is the data design process of putting data into a tabular, row-column format and abstracting duplicate data into separate tables. Structured data in relational columns is capable of being indexed with B-tree indexes, significantly speeding access to the data in these columns. In SQL terms, structured columns have size limits. These columns may have constraints and referential integrity applied to them in order to ensure consistent data quality. Examples of common structured SQL datatypes are: INT(eger), NUMBER, CHAR(acter), VARCHAR, DATE, TIMESTAMP.

Unstructured Data: As used herein, the term "unstructured data" refers to data that falls outside the scope of the definition above for structured data. Thus, the term unstructured data encompasses files, documents or objects with free form text or embedded values included therein. This data includes the complete set of bytes, often including binary-format data, that was used by the application that generated it. Examples of unstructured data include word processing documents (e.g., Microsoft Word documents in their native format), Adobe Acrobat documents, emails, image files, video files, audio files, and other files in their native formats relative to the software application that created them. In SQL terms, unstructured columns have very large, if not unlimited size. Common examples of unstructured SQL datatypes are: BLOB, TEXT, XML, RAW, and IMAGE. Unstructured objects may also be stored outside the database, for example in operating system files. Access to these external objects from within the database engine uses links in the metadata in the database table to the storage location.

There are a number of reasons why XML is will not normally be categorized as "structured" as that term is used herein:

XML may have large or unlimited sized values

XML often does not have strongly enforced datatyping

XML has a flexible schema

XML values in elements and attributes is often not as rigidly conformed and carefully cleansed as traditional "structured" database columns Although the concept of "semi-structured" data with flexible schemas is emerging, particularly for XML, for present purposes everything that is not has not been normalized and persisted to a relational database will be considered unstructured data. As such, a column that is of the XML datatype would thus fall under this present definition of "unstructured data".

Metadata: As used herein, the term "metadata" in the context of data objects and documents refers to data that describes or characterizes a data object or document. Examples of object and document metadata include but are not limited to file type, byte size, date created, date last modified, author, title, information about the document's/object's data source (optionally including the name and version number of the program used to generate the document), information about whether the data matches other data, subject coverage, classification information (e.g. information about its concepts, person/place/entity names that are found within the document/data object, word counts, etc.), position information relating to data within a document/object, or other content-derived information about documents/objects.

Bus: As used herein, the term "bus" refers to a logical bus which encompasses any physical interconnect for which devices and locations are accessed by an address. Examples of buses that could be used in the practice of the present invention include, but are not limited to the PCI family of buses (e.g., PCI-X and PCI-Express) and HyperTransport buses.

Pipelining: As used herein, the terms "pipeline", "pipelined sequence", or "chain" refer to an arrangement of application modules wherein the output of one application module is connected to the input of the next application module in the sequence. This pipelining arrangement allows each application module to independently operate on any data it receives during a given clock cycle and then pass its output to the next downstream application module in the sequence during another clock cycle.

Full-Text Search: As used herein, the term "full-text search" refers to scanning through the entire body of a document or object, considering every word or byte. This processing may allow for approximations, tokenization based on tagging for a flexible schema, wild-carding, or complex matching.

Text Analytics and Text Mining: As used herein, the terms "text analytics" and "text mining" refer to algorithms that operate on document objects using complex language concepts such as semantics. Examples of text analytic/text mining processing include: named entity recognition, content extraction, document classification, document summarization, natural language processing, statistical pattern learning, and relevance ranking.

BACKGROUND OF THE INVENTION

Enterprises such as corporations, institutions, agencies, and other entities have massive amounts of data that they need to manage. While some of an enterprise's critical data are normalized, structured, and stored in relational databases, most enterprises' data (generally thought to be around 80% of enterprise data) is unstructured. With conventional computing systems, effective management and efficient access to such unstructured data is problematic.

Indexing is a well-known technique that is used to increase the efficiency by which data can be searched. An index is a list of terms and pointers associated with a collection of data. An example of such an index 100 is shown in FIG. 1. Index 100 comprises a plurality of index entries 102, with each index entry 102 comprising a term 104 (see the "term" column in the table) and one or more pointers 106 (see the "pointer(s)" column in the table). The terms 104 in an index can be words, phrases, or other information associated with the data. In many situations, these terms are user-specified. Each pointer 106 in an index corresponds to the term 104 for that entry 102 and identifies where that term can be found in the data. With unstructured data, the data collection often comprises a plurality of documents. Examples of documents include items such a word processing files, spreadsheet files, emails, images, Adobe Acrobat files, web pages, books, pages of books, etc.

However, the inventors note their belief that conventional indexing techniques require a tremendous amount of time to generate an effective index. Even relatively small data sets can take days to effectively index with conventional indexing techniques deployed in software on central processors such as GPPs because of indexing's computationally-intensive nature. Because of the sheer volume of data that enterprises encounter on a daily basis, it is simply not practical for enterprises to index all of the data in its possession (and to which it has access) using these conventional indexing techniques. Instead, enterprises are forced to make a priori decisions as to which data will be subjected to indexing; this is particularly true for unstructured data which comprises the bulk of most enterprises' data. In doing so, enterprises are left without an effective means for efficiently managing and searching much of its data.

SUMMARY OF THE INVENTION

In an effort to address this need in the art, the inventors herein disclose a technique for hardware-accelerating the generation of metadata for data. This data may comprise both structured and/or unstructured data. From this metadata, rich indexes can be generated to enable robust and high performance data searching and analysis. With embodiments of the present invention, data is streamed into a coprocessor, and metadata for the indexes is generated at bus bandwidth rates, thereby leading to dramatic improvements in indexing latency. Because of such improvements in latency, much larger amounts (if not all) of an enterprise's data can be efficiently and effectively indexed.

In doing so, the present invention preferably harnesses the underlying hardware-accelerated technology disclosed in the following patents and patent applications: U.S. Pat. No. 6,711,558 entitled "Associated Database Scanning and Information Retrieval", U.S. Pat. No. 7,139,743 entitled "Associative Database Scanning and Information Retrieval using FPGA Devices", U.S. Patent Application Publication 2006/0294059 entitled "Intelligent Data Storage and Processing Using FPGA Devices", U.S. Patent Application Publication 2007/0067108 entitled "Method and Apparatus for Performing Biosequence Similarity Searching", U.S. Patent Application Publication 2008/0086274 entitled "Method and Apparatus for Protein Sequence Alignment Using FPGA Devices" (published from U.S. application Ser. No. 11/836,947, filed Aug. 10, 2007), U.S. Patent Application Publication 2007/0130140 entitled "Method and Device for High Performance Regular Expression Pattern Matching", U.S. Patent Application Publication 2007/0260602 entitled "Method and Apparatus for Approximate Pattern Matching" (published from U.S. application Ser. No. 11/381,214, filed May 2, 2006), U.S. Patent Application Publication 2007/0174841 entitled "Firmware Socket Module for FPGA-Based Pipeline Processing", and U.S. Patent Application Publication 2007/0237327 entitled "Method and System for High Throughput Blockwise Independent Encryption/Decryption"), the entire disclosures of each of which are incorporated herein by reference.

As documents are streamed into a coprocessor, any of a number of metadata generation operations can be flexibly performed on the document stream. For example, exact matching and approximate matching operations can be performed on the words within a document stream to find which words within the document stream are "hits" against the words in any of a number of dictionaries. From these "hits", rich indexes can quickly be generated.

For ease of reference, the term "documents" will be often be used to describe the unstructured data that is indexed in accordance with various embodiments of the present invention. However, it should be noted that the use of the term "documents" is meant to be only exemplary as other forms unstructured data can also be indexed using the techniques described herein. Also, the term "words" is used to describe bits within a data stream that are grouped together for the purposes of metadata generation operations. Words preferably correspond to the bytes that form discrete character strings, wherein the characters may be any combination of letters, numbers, or other characters.

In accordance with an extremely powerful aspect of an embodiment of the invention, the coprocessor can perform regular expression pattern matching on a received document stream to detect whether any of a plurality of pre-defined patterns exist within the document stream. Examples of patterns that can detected using regular expression pattern matching include social security numbers, credit card numbers, telephone numbers, email address, etc. By developing indexes based on these patterns, an enterprise can effectively answer an indefinite pattern-based question such as "How many of our documents contain a credit card number?" without having to re-analyze all of the enterprise's documents. Instead, the generated index pertaining to the credit card pattern can be accessed to lookup all documents that have been identified as containing a credit card number.

Furthermore, classification and clustering operations can be performed on documents using a coprocessor to further analyze and index those documents.

The high performance stream indexing that is enabled by the present invention has a myriad of useful applications. For example, the email traffic within and/or incoming to an enterprise can be efficiently indexed "on the fly" before or as that email traffic reaches its addressees.

Similarly, the web traffic (e.g., the web pages downloaded by user computers within an enterprise) can also be indexed "on the fly" using various embodiments of the present invention.

Web search engines could employ the embodiments of the present invention to stream web page content through an appliance configured to perform the metadata generation and index generation techniques described herein. The web search engine can then apply search queries against the generated index(es) when formulating responses to those search queries. It is expected that the present invention can be employed to dramatically reduce the lag time that it takes for new web pages to become "findable" through Internet search engines.

Also, the embodiments of the present invention can be employed to operate on data being saved to a disk by any computers within an enterprise.

Another application pertains to analyzing and indexing data streams such as incoming sales transactions, incoming news wire information, and log files.

Yet another application pertains to retroactively indexing existing enterprise data, including indexing previously-unindexed enterprise data and re-indexing previously-indexed enterprise data.

These and other features and advantages of the present invention will be apparent to those having ordinary skill in the art upon review of the following description and drawings.

BRIEF DESCRIPTION OF THE DRAWINGS

FIG. 11(a) depicts a stream pre-processing firmware pipeline that includes a word counting module;

FIG. 11(b) depicts an exemplary index that includes metadata relating to the word counting function of FIG. 11(a);

FIGS. 13(a) and (b) depict exemplary firmware pipelines that employ histogram generation to enable document clustering;

FIGS. 14(a) and (b) depict exemplary firmware pipelines that perform classification, specialized index generation, and histogram generation operations on incoming documents;

DETAILED DESCRIPTION OF THE PREFERRED EMBODIMENTS

Figure 2A:
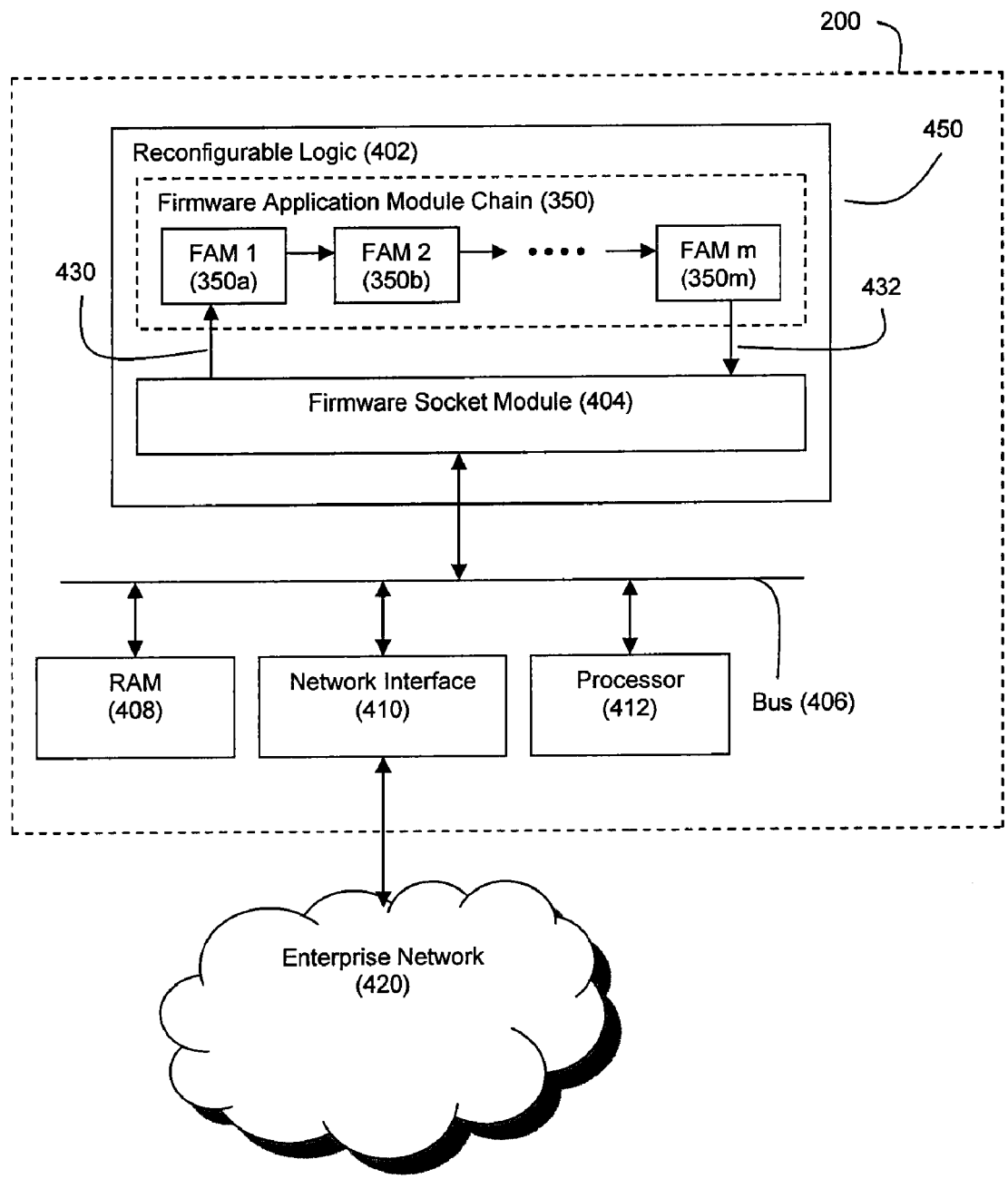
FIG. 2(a) illustrates an exemplary metadata generating appliance in accordance with an embodiment of the present invention.

FIG. 2(a) depicts an exemplary embodiment for a metadata generating appliance 200. While an embodiment of appliance 200 can be referred to as a metadata generating appliance, it should be noted that functionalities in addition to metadata generation can be supported by appliance 200, as explained in the above-referenced and incorporated U.S. patent application Ser. No. 11/938,709, filed this same day, entitled "Method and System for High Performance Integration, Processing and Searching of Structured and Unstructured Data Using Coprocessors".

Preferably, appliance 200 employs a hardware-accelerated data processing capability through coprocessor 450 to generate the desired metadata. Within appliance 200, a coprocessor 450 is positioned to receive data that streams into the appliance 200 from a network 420 (via network interface 410). Network 420 preferably comprises an enterprise network (whether LAN or WAN), in which various disparate data sources are located. Such incoming data may comprise both structured and unstructured data as appliance 200 can provide beneficial metadata generation operations for both data types.

The computer system defined by processor 412 and RAM 408 can be any commodity computer system as would be understood by those having ordinary skill in the art. For example, the computer system may be an Intel Xeon system or an AMD Opteron system. Thus, processor 412, which serves as the central or main processor for appliance 200, preferably comprises a GPP.

In a preferred embodiment, the coprocessor 450 comprises a reconfigurable logic device 402. Preferably, data streams into the reconfigurable logic device 402 by way of system bus 406, although other design architectures are possible (see FIG. 3(b)). Preferably, the reconfigurable logic device 402 is a field programmable gate array (FPGA), although this need not be the case. System bus 406 can also interconnect the reconfigurable logic device 402 with the appliance's processor 412 as well as the appliance's RAM 408. In a preferred embodiment, system bus 406 may be a PCI-X bus or a PCI-Express bus, although this need not be the case.

The reconfigurable logic device 402 has firmware modules deployed thereon that define its functionality. The firmware socket module 404 handles the data movement requirements (both command data and target data) into and out of the reconfigurable logic device, thereby providing a consistent application interface to the firmware application module (FAM) chain 350 that is also deployed on the reconfigurable logic device. The FAMs 350i of the FAM chain 350 are configured to perform specified data processing operations on any data that streams through the chain 350 from the firmware socket module 404. Preferred examples of FAMs that can be deployed on reconfigurable logic in accordance with a preferred embodiment of the present invention are described below.

The specific data processing operation that is performed by a FAM is controlled/parameterized by the command data that FAM receives from the firmware socket module 404. This command data can be FAM-specific, and upon receipt of the command, the FAM will arrange itself to carry out the data processing operation controlled by the received command. For example, within a FAM that is configured to perform an exact match operation, the FAM's exact match operation can be parameterized to define the key(s) that the exact match operation will be run against. In this way, a FAM that is configured to perform an exact match operation can be readily re-arranged to perform a different exact match operation by simply loading new parameters for one or more different keys in that FAM.

Once a FAM has been arranged to perform the data processing operation specified by a received command, that FAM is ready to carry out its specified data processing operation on the data stream that it receives from the firmware socket module. Thus, a FAM can be arranged through an appropriate command to process a specified stream of data in a specified manner. Once the FAM has completed its data processing operation, another command can be sent to that FAM that will cause the FAM to re-arrange itself to alter the nature of the data processing operation performed thereby. Not only will the FAM operate at hardware speeds (thereby providing a high throughput of data through the FAM), but the FAMs can also be flexibly reprogrammed to change the parameters of their data processing operations.

The FAM chain 350 preferably comprises a plurality of firmware application modules (FAMs) 350a, 350b, . . . that are arranged in a pipelined sequence. However, it should be noted that within the firmware pipeline, one or more parallel paths of FAMs 350i can be employed. For example, the firmware chain may comprise three FAMs arranged in a first pipelined path (e.g., FAMs 350a, 350b, 350c) and four FAMs arranged in a second pipelined path (e.g., FAMs 350d, 350e, 350f, and 350g), wherein the first and second pipelined paths are parallel with each other. Furthermore, the firmware pipeline can have one or more paths branch off from an existing pipeline path. A practitioner of the present invention can design an appropriate arrangement of FAMs for FAM chain 350 based on the processing needs of a given application.

A communication path 430 connects the firmware socket module 404 with the input of the first one of the pipelined FAMs 350a. The input of the first FAM 350a serves as the entry point into the FAM chain 350. A communication path 432 connects the output of the final one of the pipelined FAMs 350m with the firmware socket module 404. The output of the final FAM 350m serves as the exit point from the FAM chain 350. Both communication path 430 and communication path 432 are preferably multi-bit paths.

The nature of the software and hardware/software interfaces used by appliance 200, particularly in connection with data flow into and out of the firmware socket module are described in greater detail in the above-referenced and incorporated U.S. Patent Application Publication 2007/0174841.

Figure 2B:
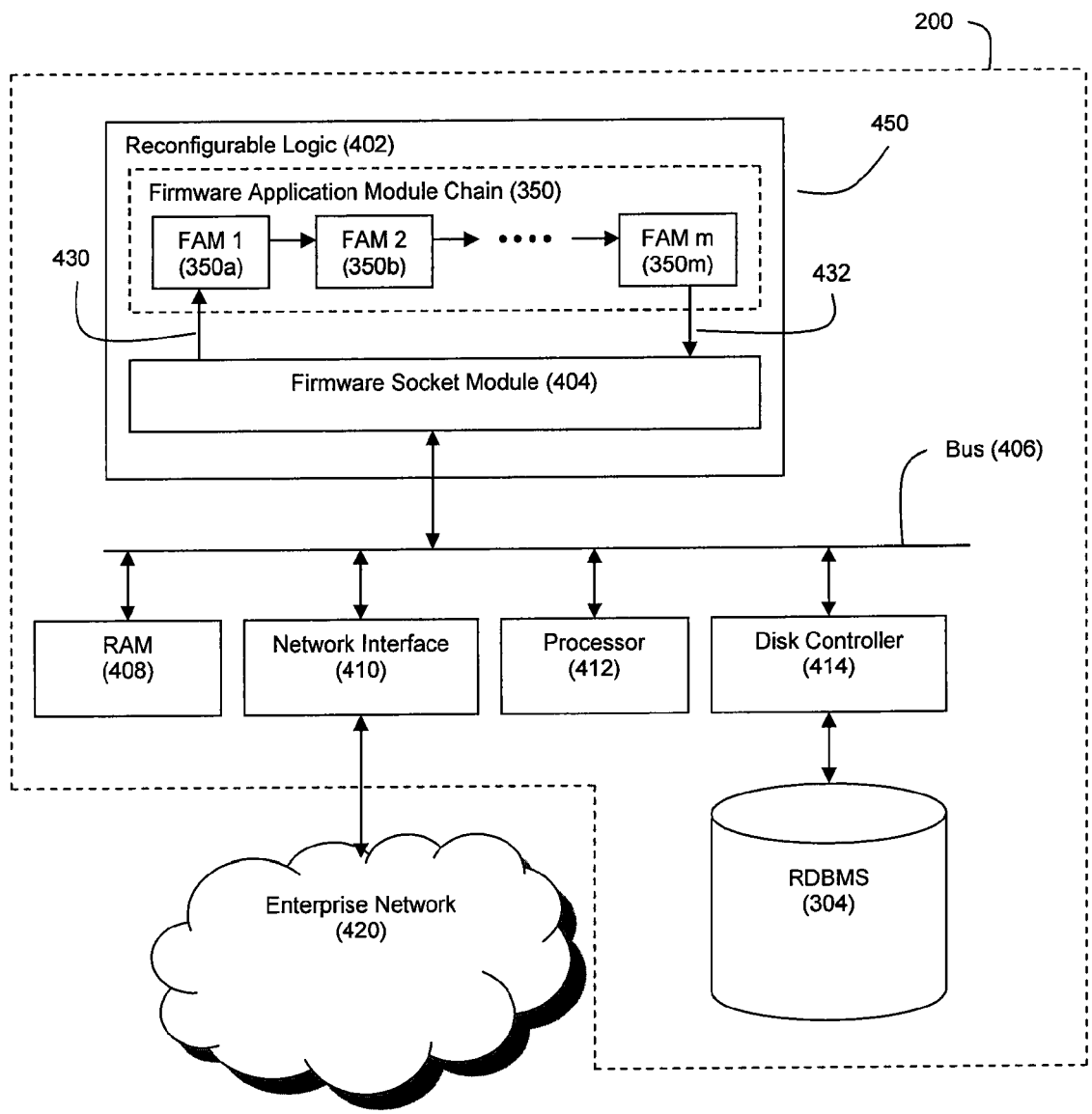
FIG. 2(b) illustrates an exemplary metadata generating appliance in accordance with another embodiment of the present invention.

FIG. 2(b) depicts another exemplary embodiment for appliance 200. In the example of FIG. 2(b), appliance 200 includes a relational database management system 304 that is in communication with bus 406 via disk controller 414. Thus, the data that is streamed through the coprocessor 450 may also emanate from RDBMS 304. Furthermore, the metadata generated by coprocessor 450 can be stored as structured data within RDBMS 304 from which it can be used as an index for various data searching/analysis operations. Such indexes can take the form of B-tree indexes. An example of such usage for the appliance 200 of FIG. 2(b) is described in the above-referenced and incorporated U.S. patent application Ser. No. 11/938,709, filed this same day, entitled "Method and System for High Performance Integration, Processing and Searching of Structured and Unstructured Data Using Coprocessors".

Figure 2C:
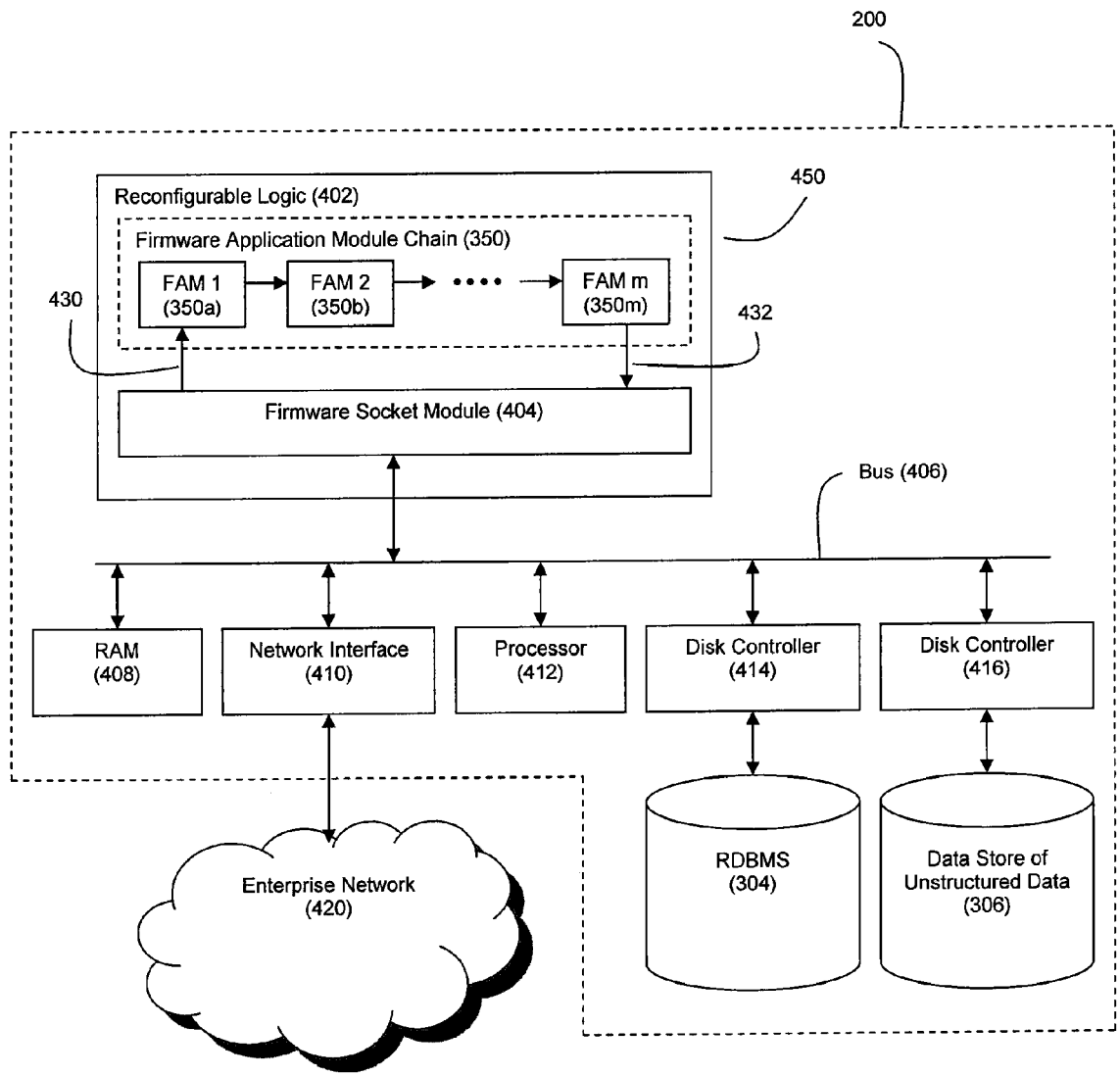
FIG. 2(c) illustrates an exemplary metadata generating appliance in accordance with yet another embodiment of the present invention.

FIG. 2(c) depicts another exemplary embodiment for appliance 200. In the example of FIG. 2(c), appliance 200 also includes a data store 306 of unstructured data that is in communication with bus 406 via disk controller 416. Thus, the data that is streamed through the coprocessor 450 may also emanate from data store 306. Furthermore, the unstructured data that is streamed through coprocessor 450 to generate metadata therefor can optionally be stored within data store 306. As described in the above-referenced and incorporated U.S. patent application Ser. No. 11/938,709, filed this same day, entitled "Method and System for High Performance Integration, Processing and Searching of Structured and Unstructured Data Using Coprocessors", the metadata tables within RDBMS 304 can be used to render data search/analysis operations on the unstructured data stored within data store 306 more efficient.

Figure 3A:
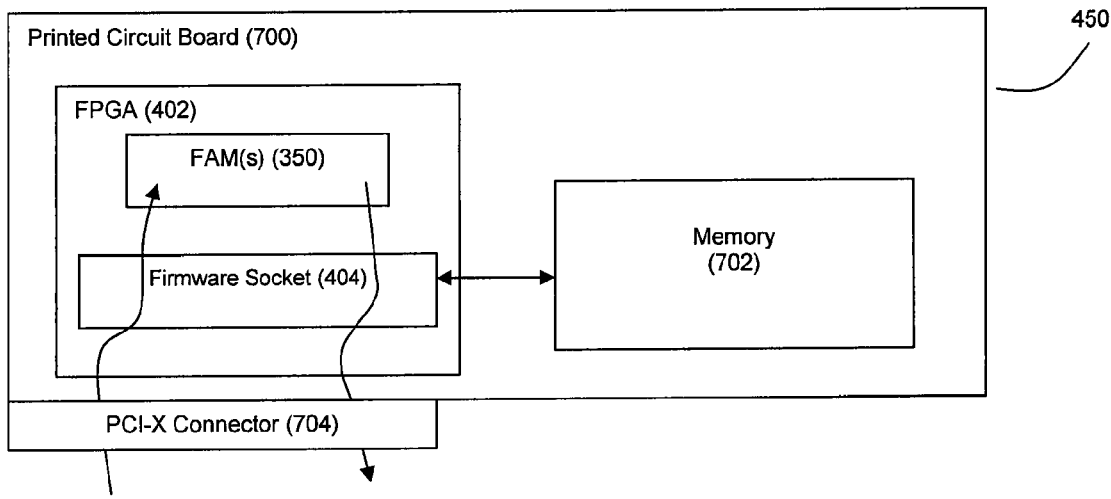
FIGS. 3(a) and (b) illustrate exemplary printed circuit boards for use in the appliances of FIGS. 2(a)-(c)

FIG. 3(a) depicts a printed circuit board or card 700 that can be connected to the PCI-X or PCI-e bus 406 of a commodity computer system for use as a coprocessor 450 in appliance 200 for any of the embodiments of FIGS. 2(a)-(c). In the example of FIG. 3(a), the printed circuit board includes an FPGA 402 (such as a Xilinx Virtex II FPGA) that is in communication with a memory device 702 and a PCI-X bus connector 704. A preferred memory device 702 comprises SRAM and DRAM memory. A preferred PCI-X or PCI-e bus connector 704 is a standard card edge connector.

Figure 3B:
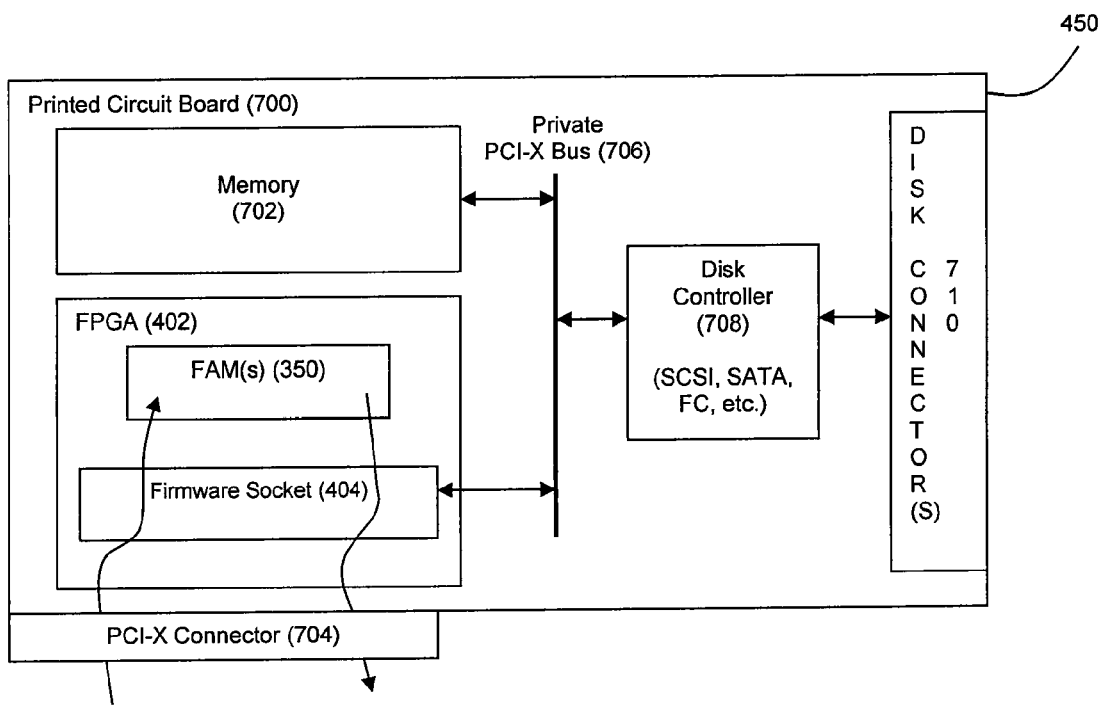

FIG. 3(b) depicts an alternate configuration for a printed circuit board/card 700. In the example of FIG. 3(b), a bus 706 (such as a PCI-X or PCI-e bus), one or more disk controllers 708, and a disk connector 710 are also installed on the printed circuit board 700. Any commodity disk interface technology can be supported, as is understood in the art. In this configuration, the firmware socket 404 also serves as a PCI-X to PCI-X bridge to provide the processor 412 with normal access to any disk(s) connected via the private PCI-X bus 706. It should be noted that a network interface can be used in addition to or in place of the disk controller and disk connector shown in FIG. 3(b).

Figure 4:
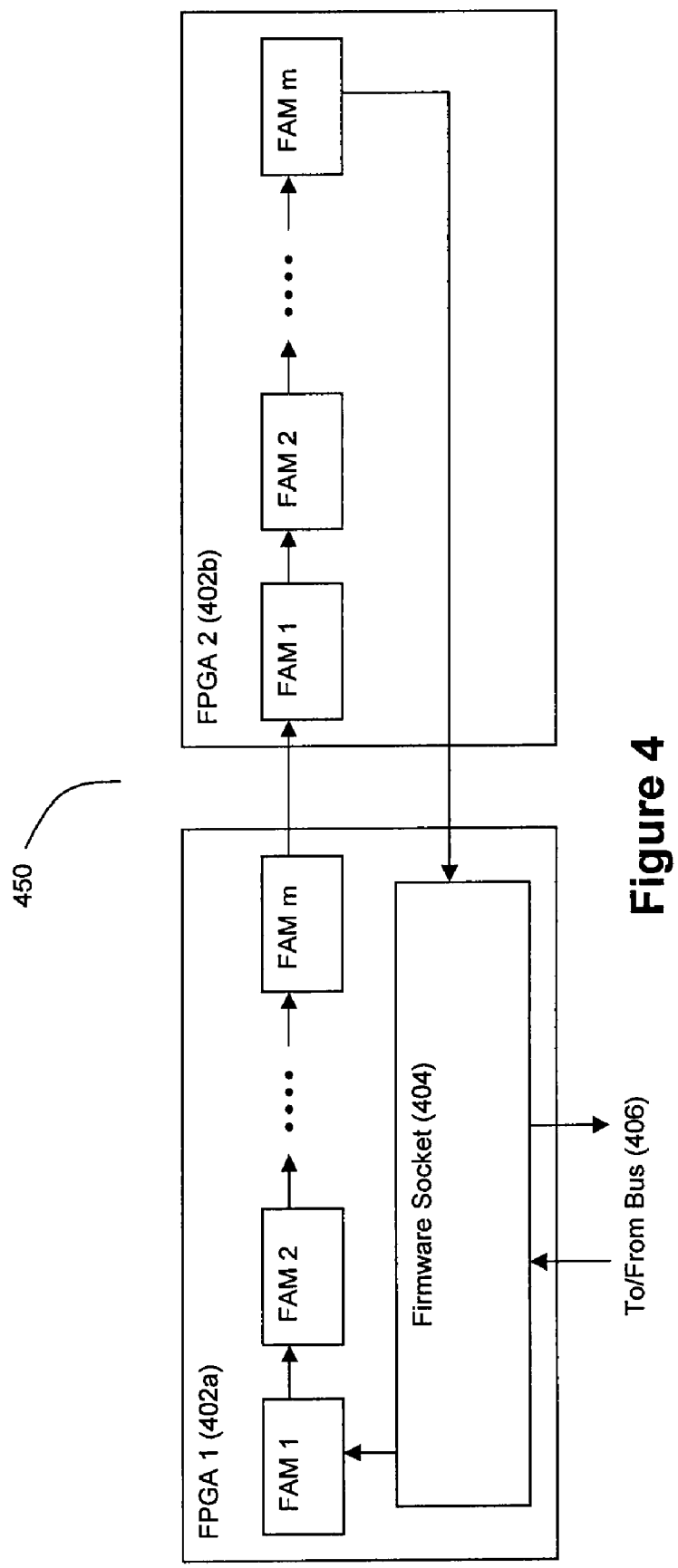
FIG. 4 illustrates an example of how a firmware pipeline can be deployed across multiple reconfigurable logic devices.

It is worth noting that in either the configuration of FIG. 3(a) or 3(b), the firmware socket 404 can make memory 702 accessible to the bus 406, which thereby makes memory 702 available for use by an OS kernel as the buffers for transfers to the FAMs from a data source with access to bus. It is also worth noting that while a single FPGA 402 is shown on the printed circuit boards of FIGS. 3(a) and (b), it should be understood that multiple FPGAs can be supported by either including more than one FPGA on the printed circuit board 700 or by installing more than one printed circuit board 700 in the appliance 200. FIG. 4 depicts an example where numerous FAMs in a single pipeline are deployed across multiple FPGAs.

Figures 5A, 5B:
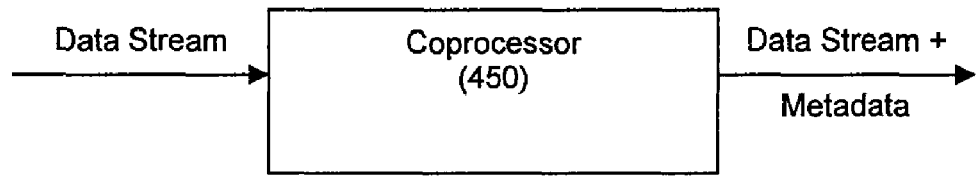
FIG. 5(a) is a high level block diagram view of how a coprocessor can be used to generate metadata for data that streams therethrough.
FIG. 5(b) depicts an exemplary index that can be created from the metadata produced by the coprocessor of FIG. 5(a)

FIG. 5(a) depicts at a high level a coprocessor 450 that receives an incoming data stream, generates metadata for the data stream, and outputs the data stream together with the generated metadata. Examples of different hardware-accelerated metadata generation operations will be described in greater detail hereinafter. Any of a number of text mining and text analytic operations can be employed to generate metadata. Some examples of metadata generation operations include but are not limited to part-of-speech tagging, information and entity extraction, document classification, document clustering, and text summarization. In these examples, the data stream under consideration will be a stream of documents. As noted, this usage in only exemplary as data streams other than documents can be readily processed using coprocessor 450 and the techniques described herein. These data streams may comprise unstructured and/or structured data.

Figure 1:
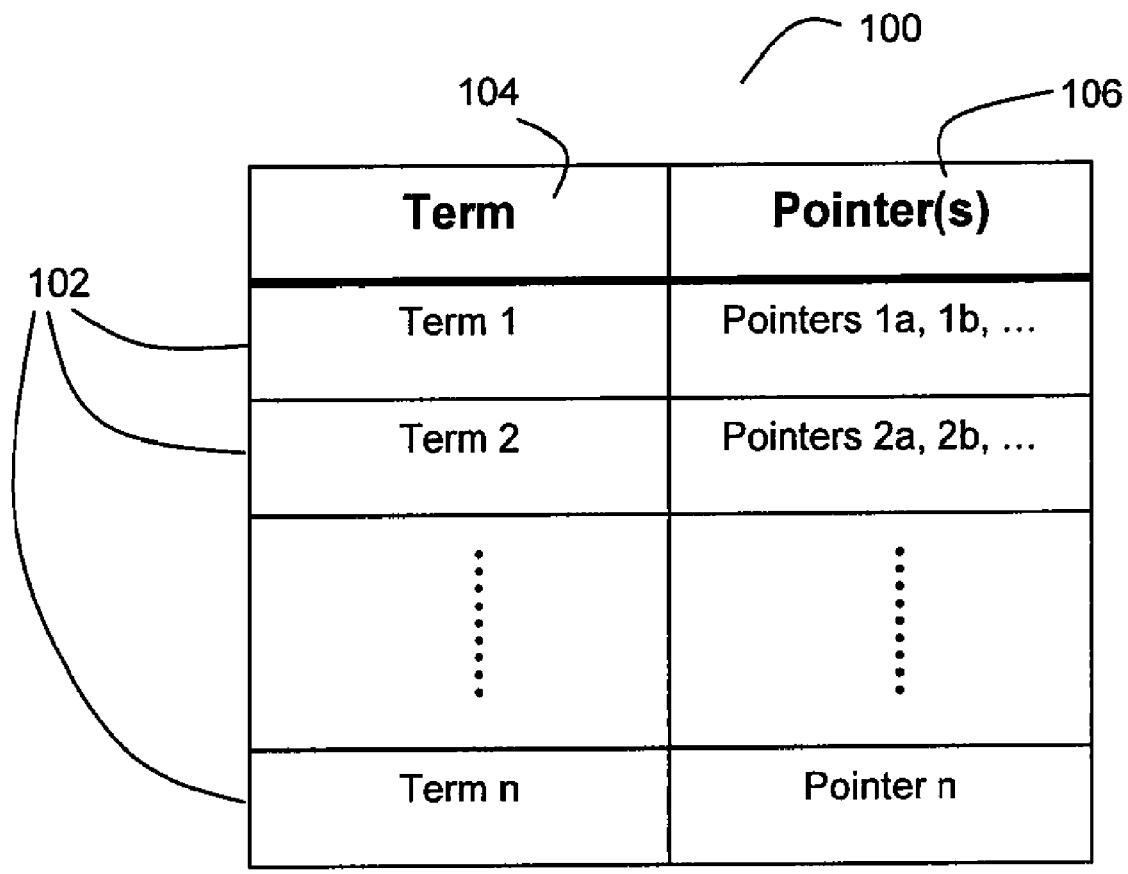
FIG. 1 depicts an exemplary index.

FIG. 5(b) depicts an exemplary index 100 that can built from the metadata generated by coprocessor 450. As described in connection with FIG. 1, each table entry 102 comprises a term 104 and its associated pointer 106. In the example of FIG. 5(b), each pointer 106 comprises a document identifier $D_i$ and one or more position identifiers $p_i$. Each document identifier identifies a document in which the term 104 corresponding to that pointer 106 is present. Each position identifier in the pointer identifies a position within the identified document where that term 104 is located. Preferably, the position identifier is represented by a byte offset relative to the start of a document. Thus, the pointers for the term "Azkaban" in FIG. 5(b) establish that "Azkaban" can be found in Document $D_{12}$ at position $p_1$ and in Document $D_{9919}$ at positions $p_1$ and $p_2$. Any of a number of well-known techniques can be used to map pointers such as the ones shown in FIG. 5(b) to the documents stored within a file system of an enterprise.

Figure 6:
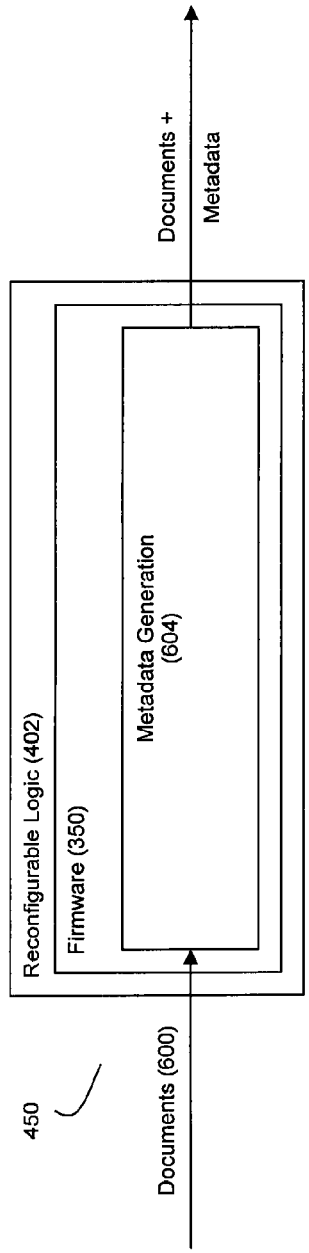
FIG. 6 depicts an exemplary firmware pipeline that can be deployed within reconfigurable logic to perform a desired metadata generation operation.

FIG. 6 depicts exemplary firmware 350 that can be employed in reconfigurable logic 402 to perform a metadata generation operation 604 on an incoming stream of documents 600. An example of a metadata generation operation 604 includes a stream pre-processing operation 602. The stream pre-processing preferably comprises various position and feature vector extraction operations. These operations may employ techniques known in the art as cryptographic hashing to provide the term descriptor and tables to enable the values and lists described herein to be generated and exploited.

Figure 7A:
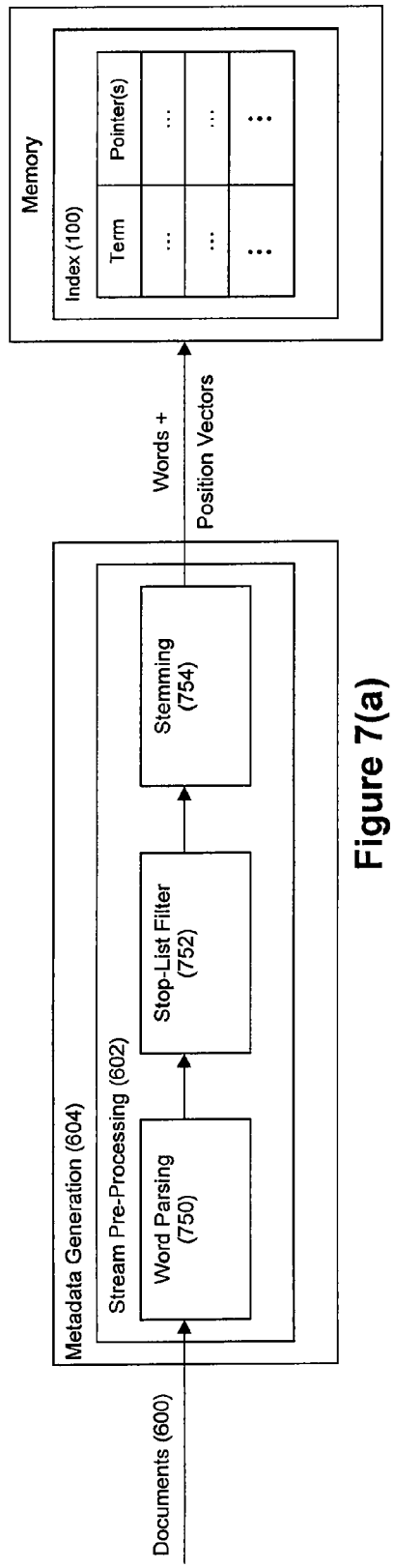
FIG. 7(a) depicts an exemplary firmware pipeline that can be used to perform the stream pre-processing operation shown in FIG. 6.

FIG. 7(a) depicts an exemplary sequence of processing modules for the stream pre-processing stage 602. A word parsing module 750 preferably operates to identify whitespace and/or punctuation delimited terms in the documents and record their positions. These recorded positions can then be used to help determine word positions within documents (e.g., the $p_i$ values in the pointers of FIG. 5(b)). A stop list filter module 752 preferably operates to remove words from the document stream that appear on a stop list. This may be desirable to remove common words (e.g. "the", "a", "an") for which indexing may not be particularly helpful from the document stream. The stop list is preferably adjustable to control which words will be removed from the document stream. A stemming module 754 preferably operates to stem words in the document stream to their roots. Examples of stemming operations include removing plurals, removing prefixes, removing suffixes, removing gerunds, etc. It should also be noted that other processing modules can be included in stream pre-processing module 602 if desired. For example, a spell-checking module can be used to correct possible spelling errors that exist within a word stream.

Figure 7B:
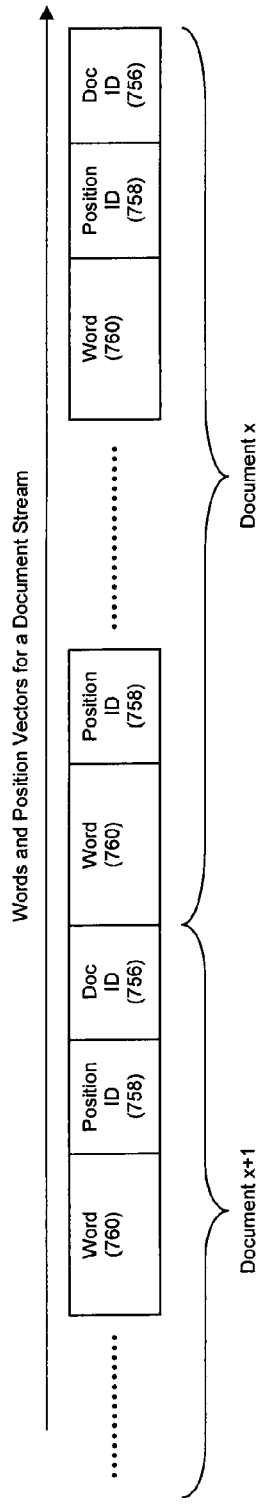
FIG. 7(b) depicts an exemplary output stream of words and feature vectors that can be produced by the firmware pipeline of FIG. 7(a)

FIG. 7(b) depicts an exemplary output data stream from the stream pre-processing operation 602, wherein the stream includes the parsed words 760 such that each parsed word is accompanied by a position identifier 758 for that word. Furthermore, a document identifier 756 is present that identifies when a new document is present within the stream. While the example of FIG. 7(b) shows a serial stream of such data, it should be noted that the document identifiers 756 and position identifiers 758 can flow in bit streams within firmware 350 that are parallel to a bit stream of words 760.

Returning to FIG. 7(a), as words stream through the pre-processing module 602, a memory containing an index for the documents can be generated. This index 100 can serve as a general index that is populated with entries for each different word encountered by the stream pre-processing module 602 together with its associated position vector information (e.g., document identifier and position identifier as shown in FIG. 5(b)). If a word that has already been added to general index 100 is encountered again within the stream, then the pointer information in index 100 for that word can be updated to reflect the latest position at which the word has been found.

It should be noted that the memory used to store the index 100 as words stream through the pre-processing module 602 can be located in any of a number of places. For example, this memory can be located in the available on-chip memory of the FPGA 402. This memory could also be memory device 702 shown in FIGS. 3(a) and (b). Further still, this memory could be RAM 408. This memory could even be a location such as RDBMS 304. Preferably, coprocessor 450 performs the action of updating index 100. Techniques such as hashing can be used to insert new data into the index 100.

It should be noted that each of the modules shown in FIG. 7(a) as well as the stream pre-processing operation 602 itself is an optional feature. If desired, the metadata generation operation 604 can be performed on documents 600 that have not been pre-processed.

Figure 8A:
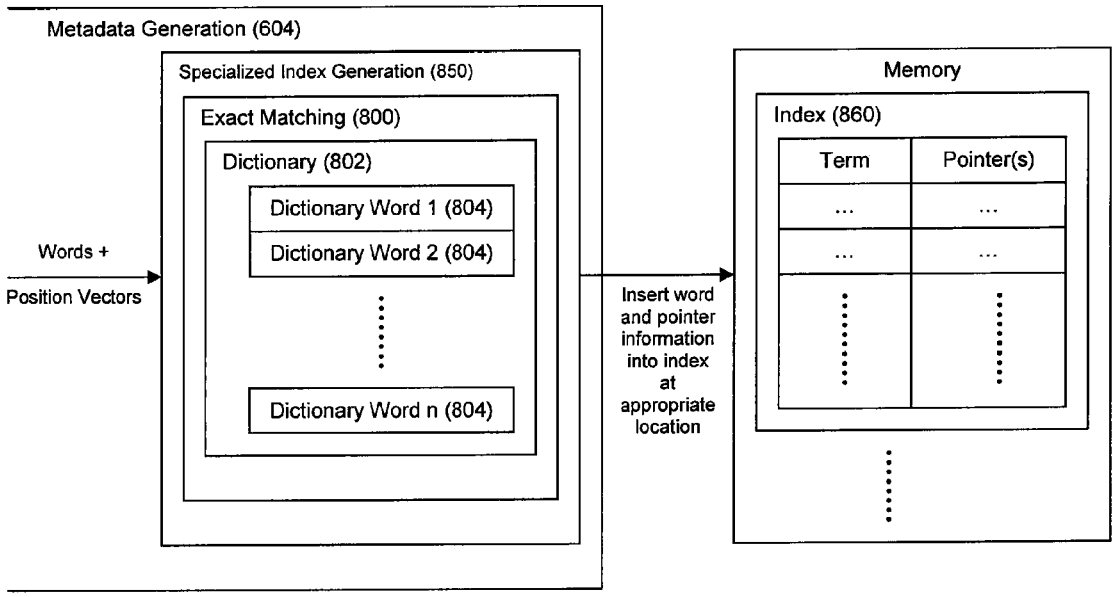
FIG. 8(a) depicts an exemplary specialized index generation operation that seeks to exactly match the words within the incoming data stream against the words in a dictionary to thereby generate a specialized index.

FIG. 8(a) depicts an exemplary embodiment for the metadata generation operation 604 wherein a specialized index generation operation 850 is also performed. In FIG. 8(a), words and position vectors stream into an exact matching module 800. This exact matching module 800 is loaded with the words 804 from a dictionary 802. The exact matching modules will use words 804 as keys against which the streaming words are compared to determine whether any exact matches exist therebetween. As matches are found by module 800, a specialized index 860 maintained in the memory is updated with the matching word information and the corresponding pointers for those matching words (see FIG. 5(b)). The position vectors found by the stream pre-processing operation 602 (e.g., document identifiers 756 and position identifiers 758) can be used as the pointer information. Thus, in addition to the general index 100 described in connection with FIG. 7(a), a specialized index 860 (that is specific as to dictionary 802) can also be efficiently generated via the data processing operations of coprocessor 450.

Any of a number of exact matching techniques can be used to perform the exact matching operation. For example, the hardware-accelerated matching techniques disclosed in the above-referenced and incorporated U.S. Pat. Nos. 6,711,558 and 7,139,743 and U.S. Patent Application Publications 2006/0294059, 2007/0130140, and U.S. Patent Application Publication 2007/0260602 entitled "Method and Apparatus for Approximate Pattern Matching" (published from U.S. application Ser. No. 11/381,214, filed May 2, 2006).

Any collection of words can be used as dictionary 802. Examples of dictionaries 802 that can be used include large word collections such as full English language dictionaries, full foreign language dictionaries, scientific/technical dictionaries, etc. Smaller word collections can also be used.

Figure 8B:
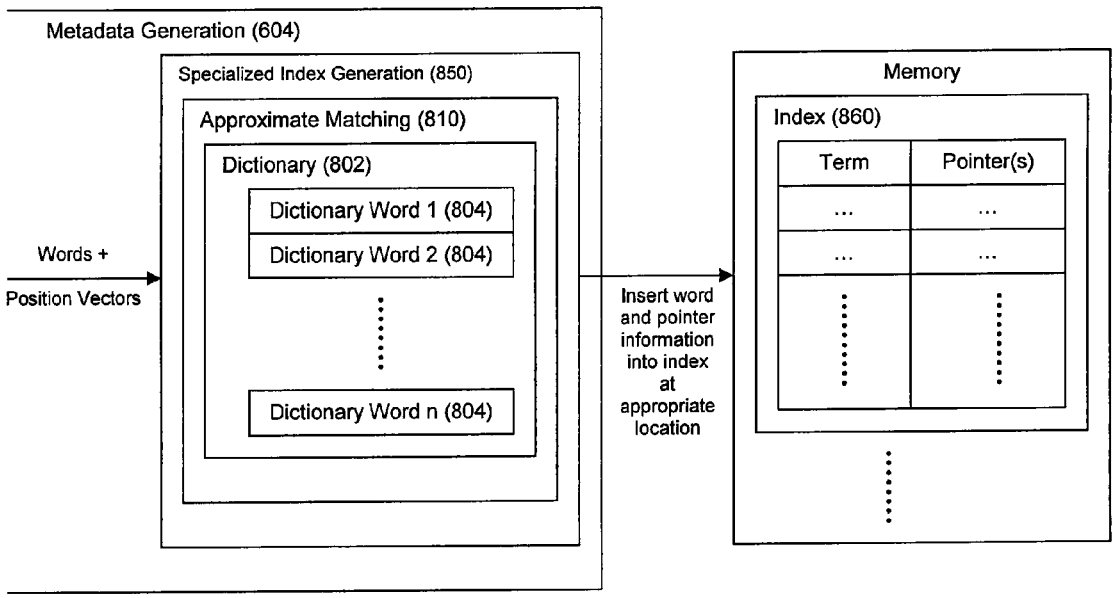
FIG. 8(b) depicts an exemplary specialized index generation operation that seeks to approximately match the words within the incoming data stream against the words in a dictionary to thereby generate a specialized index.

FIG. 8(b) depicts an alternate embodiment for index generation wherein an approximate matching module 810 is used rather than an exact matching module. It may be desirable to employ an approximate matching module 810 for the index generation operation 850 to reduce the likelihood that spelling errors and the like do not result in document text being mis-indexed. Examples of hardware-accelerated approximate matching techniques suitable for use as approximate matching module 810 are also disclosed in the above-referenced and incorporated U.S. Pat. Nos. 6,711,558 and 7,139,743 and U.S. Patent Application Publications 2006/0294059, 2007/0130140, and U.S. Patent Application Publication 2007/0260602 entitled "Method and Apparatus for Approximate Pattern Matching" (published from U.S. application Ser. No. 11/381,214, filed May 2, 2006). It should be noted that if a spell-checking module as described above is used in the stream pre-processing stage, it may be unnecessary to employ an approximate matching module to accommodate mis-spellings and the like.

It should also be noted that a plurality of exact matching/approximate matching modules 800/810 can be deployed in parallel to distribute the workload of matching streaming words to the word keys 804 across multiple matching modules 800/810. However, if desired, a single serial pipelined sequence of compare registers can be used by an matching module 800/810 to sequentially compare the streaming words with word keys 804 if desired.

It should be noted that, like the memory used to store general index 100, the memory used to store the specialized indexes 860 can be located in any of a number of places (e.g., the on-chip memory of the FPGA 402, memory device 702, etc.).

Figure 9A:
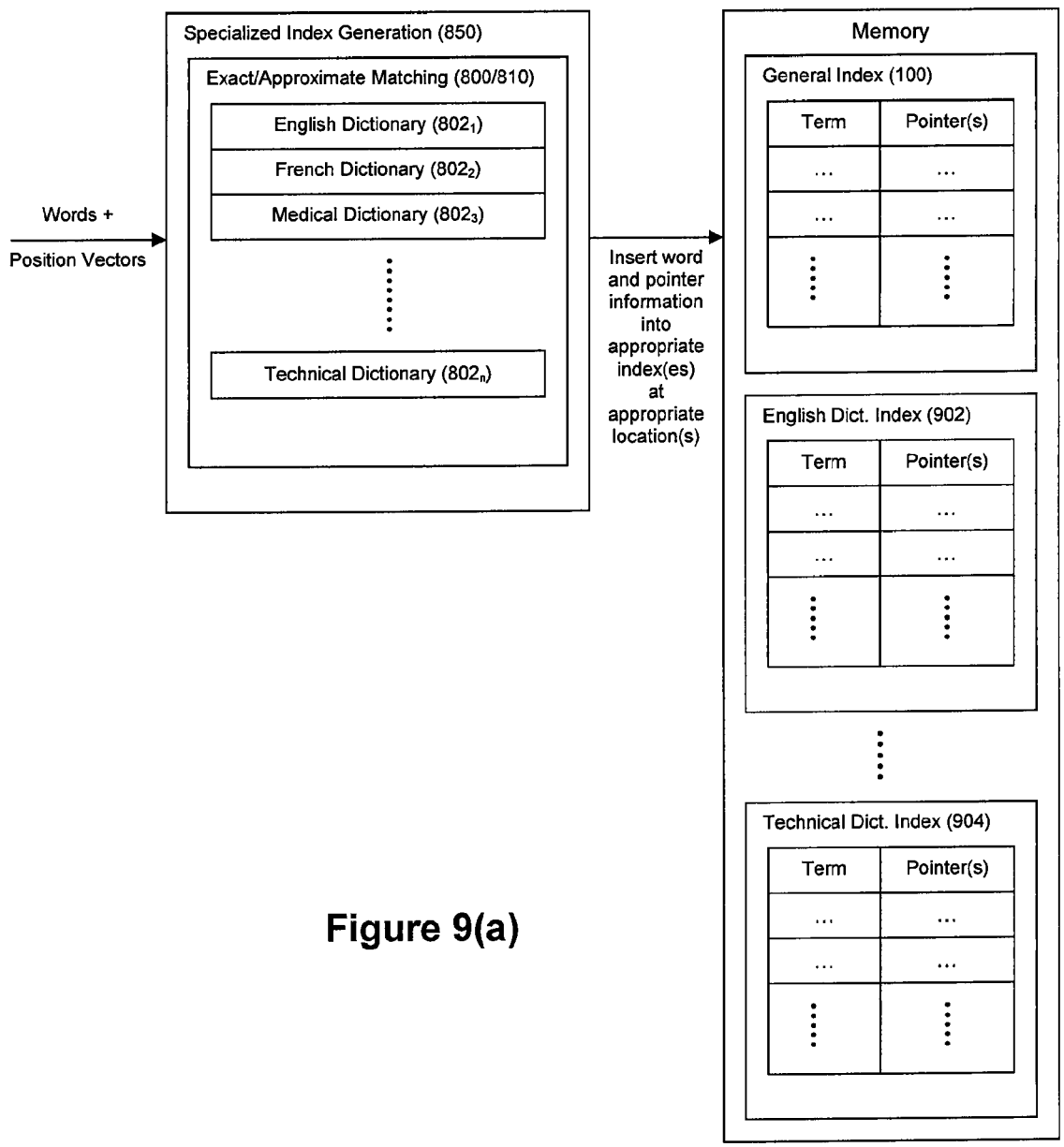
FIG. 9(a) depicts an exemplary specialized index generation operation that seeks to exactly match the words within the incoming data stream against the words in a plurality of different dictionaries to thereby generate a plurality of specialized indexes.

A powerful aspect of various embodiments of the present invention is the ability to concurrently generate multiple specialized indexes. An example of this is shown in FIG. 9(a). With this embodiment, the matching module 800/810 matches the incoming words against multiple dictionaries $802_i$, each dictionary $802_i$ having its own collection of words which will serve as the keys against which the incoming words are judged. As shown, the words within dictionaries such as an English dictionary, a French dictionary, a medical dictionary, and a technical dictionary can be compared against the incoming word stream. As matches are found between the incoming words and the words within any of these dictionaries, a specialized index associated with each of these dictionaries can be updated with pointer information. FIG. 9(a) depicts an English dictionary index 902 and a technical dictionary index 904 as examples of such specialized indexes. Preferably, these specialized indexes are pre-populated in the term column with all of the words within its associated dictionary. As that term is found within the word stream by the matching module 800/810, the pointer information for that term can be updated as appropriate.

The general index 100 in such an embodiment can be updated when words streaming through the exact matching module do not find a match in any of the dictionaries 802. Furthermore, the entries in the other specialized indexes can be merged into the general index if desired to thereby make general index 100 applicable to all of the words within document stream 600. This merger can be performed offline or concurrently with the updating of the other indexes. Otherwise, the coprocessor 450 can be configured to update the general index 100 as words stream out of the stream pre-processing module 602 and update the specialized indexes as words stream out of the exact/approximate matching module 800/810.

Figure 9B:
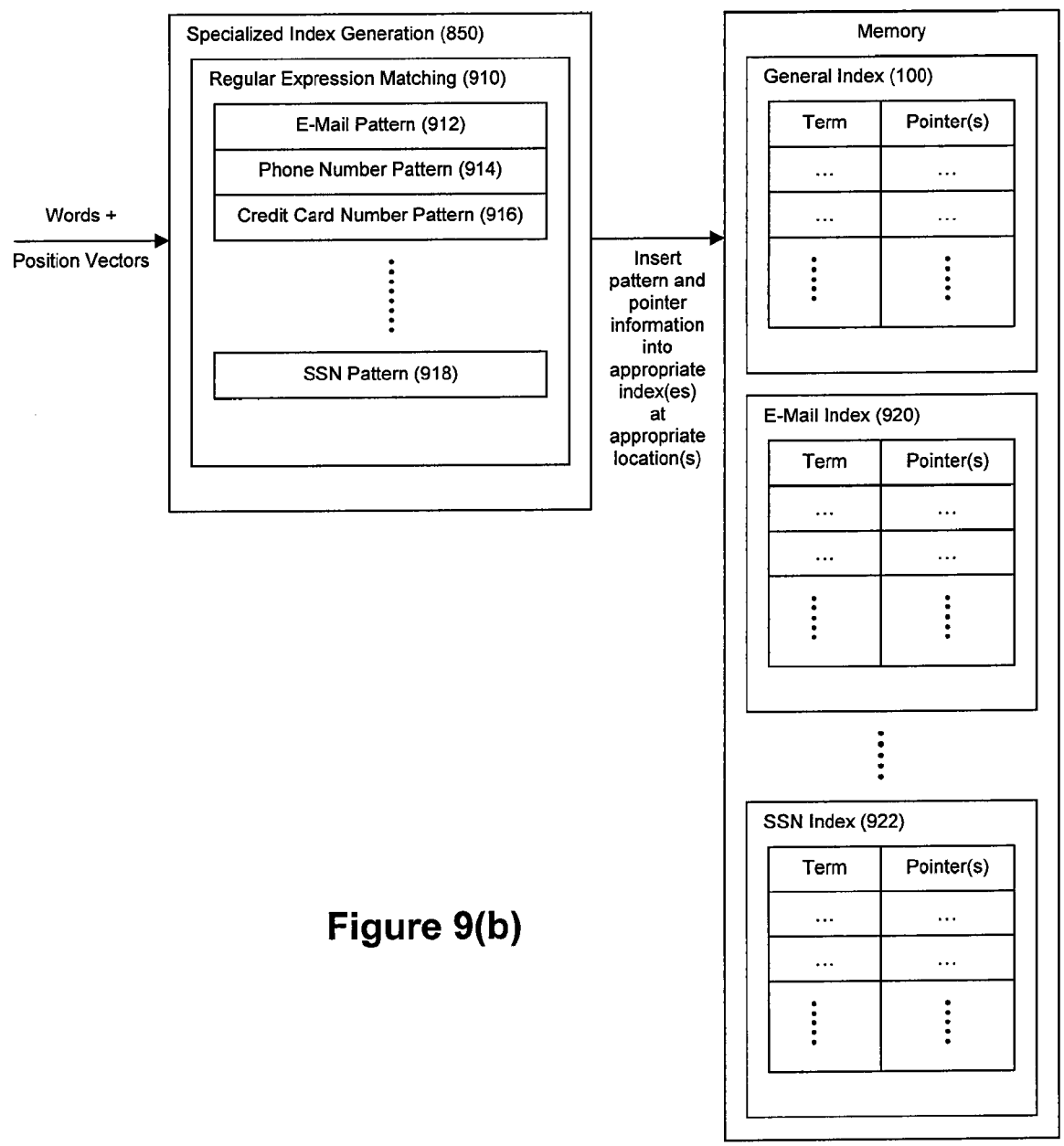
FIG. 9(b) depicts an exemplary specialized index generation operation that seeks to match the words within the incoming data stream against a plurality of different regular expression patterns to thereby generate a plurality of specialized indexes.

Another powerful aspect of various embodiments of the present invention is the ability to perform regular expression pattern matching on incoming words. An example of this is shown in FIG. 9(b). Regular expressions, as is well-known in the art, can be used to detect patterns of varying degrees of complexity within a word stream. An exemplary pattern for which regular expressions are useful means of detection is a social security number (SSN). SSNs exhibit the pattern xxx-xx-xxxx, wherein x can be any number between 0 and 9. Items such as phone numbers, credit card numbers, primary account numbers (PANs), e-mails, URLs, and others also exhibit patterns that are detectable through regular expressions.

As shown in FIG. 9(b), a regular expression matching module 910 can be deployed on coprocessor 450 (preferably in firmware 350 on a reconfigurable logic device 402). The regular expression matching module 910 can be configured to detect one or more user-defined patterns. For example, the regular expression matching module 910 in FIG. 9(b) is configured to detect words (including word portions) that exhibit an e-mail pattern 912, a phone number pattern 914, a credit card number pattern 916, and an SSN pattern 918. As these patterns are found within the word stream by the regular expression matching module 910, a specialized index associated with each of these patterns can be updated with the content of the matching pattern and with the pointer information for that matching pattern. FIG. 9(b) depicts an e-mail index 920 and a SSN index 922 as examples of such indexes. Thus, if 123-45-6789 is encountered in the word stream, then the regular expression matching module 910 will identify this pattern as a SSN pattern, and the regular expression matching module 910 will add an entry to the SSN index 922 comprising the term "123-45-6789" and a pointer to that term in the word stream. Preferably, as described in connection with FIG. 9(a), a general index 100 is also updated as words stream through the regular expression matching module 910, and the regular expression matching module 910 does not find any pattern matches.

An example of a hardware-accelerated regular expression matching technique suitable for use as regular expression matching module 910 is disclosed in the above-referenced and incorporated U.S. Patent Application Publication 2007/0130140.

Also, as noted above in connection with the matching modules 800/810, various combinations of sequential and parallel regular expression matching modules 910 can be employed within coprocessor 450 to distribute the pattern matching workload across multiple resources.

The power of such pattern indexes shown by FIG. 9(b) cannot be understated. It is typically extremely difficult for a person within an enterprise to efficiently get an answer to a question such as "Which documents within our enterprise include a SSN?" or a command such as "Show me all documents within our enterprise that include a credit card number". Similarly, it is difficult for a web search engine to provide relevant results to an Internet search query seeking to find web pages which contain credit card numbers or SSNs without being specific as to individual numbers. However, through the indexing techniques disclosed in connection with FIG. 9(b), the answers to questions such as these are readily available.

Figure 9C:
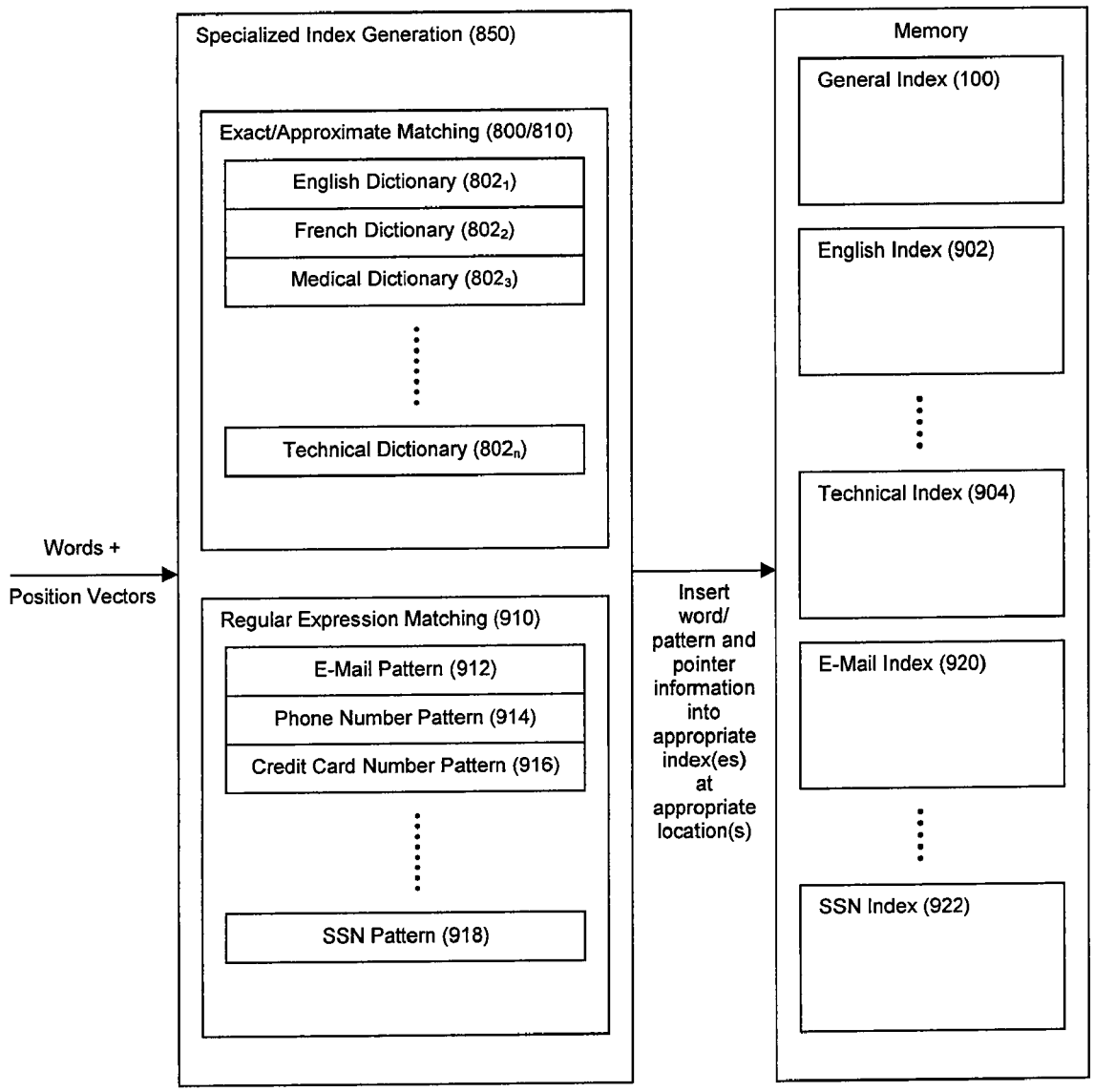
FIG. 9(c) depicts an exemplary specialized index generation operation that seeks to match the words within the incoming data stream against a plurality of different dictionaries and against a plurality of different regular expression patterns to thereby generate a plurality of specialized indexes.

FIG. 9(c) illustrates an exemplary embodiment wherein the hardware-accelerated index generation operation 850 includes one or more exact/approximate matching modules 800/810 and one or more regular expression matching modules 910 to generate corresponding specialized indexes (e.g., indexes 902, 904, 920, and 922) and a general index 100. Once again the power of such efficiently-generated indexes cannot be understated. These indexes can serve to answer complicated query commands such as "Show me all documents which include a credit card number and contain the word 'stolen'" without re-analyzing the entire set of documents 600.

It should be noted that coprocessor 450 is preferably configured to change the dictionaries and/or patterns used by the matching modules 800/810/910. Preferably, such changes are made in response to user commands received as command data by the firmware socket module 404. These changes may comprise adding/removing dictionaries/patterns and/or adding/removing words to/from the various dictionaries.

It should also be noted that the coprocessor 450 can deploy these modules 800/810 and 910 in a sequential, parallel, or hybrid sequential-parallel arrangement as desired.

Figure 10:
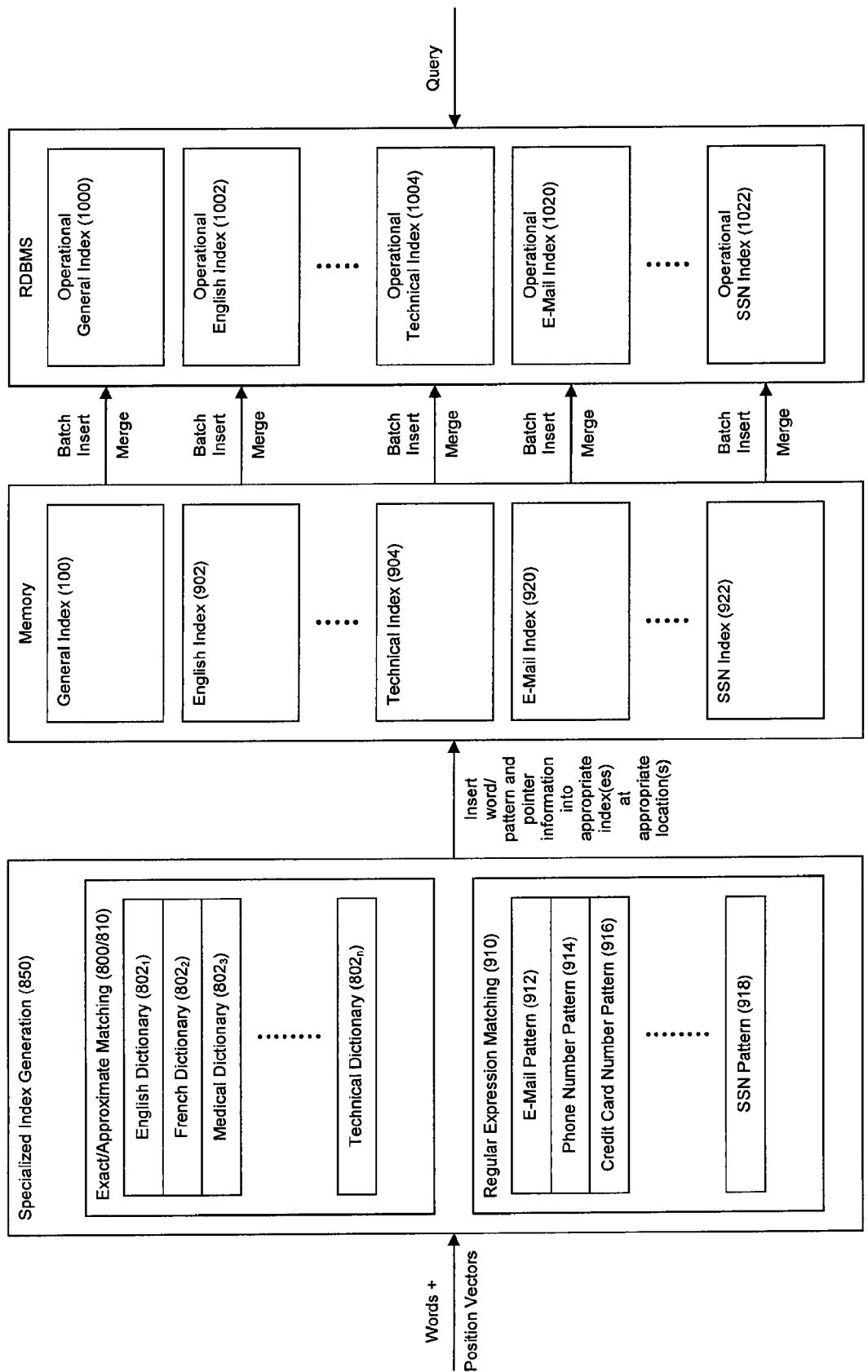
FIG. 10 depicts an exemplary technique for inserting the generated indexes into operational indexes maintained by a relational database.

FIG. 10 depicts an embodiment wherein periodic batch transfers of the generated indexes (e.g., indexes 100, 902, 904, 920, and 922) are performed to merge them into their corresponding operational counterparts within an RDBMS (e.g., RDBMS 304 or some other RDBMS within enterprise network 420). Thus, batch insert/merge operations can be performed to insert the content of general index 100 into operational general index 1000. Similarly, the content of indexes 902, 904, 920, and 922 can be inserted into operational indexes 1002, 1004, 1020, and 1022 respectively. These transfers can be performed periodically at scheduled intervals or can be performed on an as needed basis as the available memory space for indexes 100, 902, 904, 920, and 922 runs low.

After the operational indexes have been updated, the newly indexed data can then be accessed via standardized queries such as SQL commands that are applied to the operational indexes stored by SQL databases. The above-referenced and incorporated U.S. patent application Ser. No. 11/938,709, filed this same day, entitled "Method and System for High Performance Integration, Processing and Searching of Structured and Unstructured Data Using Coprocessors" discloses a particularly efficient query handling technique for queries directed toward unstructured data for which an RDBMS maintains a metadata index.

Figure 11C:
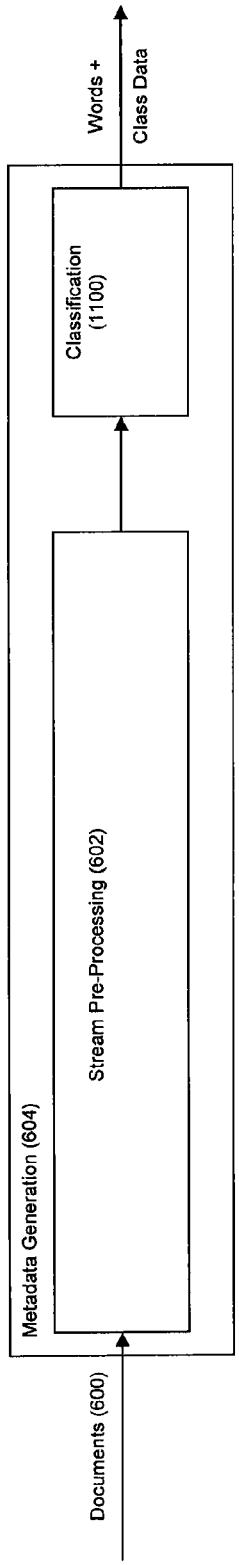
FIG. 11(c) depicts an exemplary firmware pipeline wherein the generated metadata corresponds to classification data about the incoming documents.

Another metadata generation operation that can be performed by the stream pre-processing module 602 is a word counting operation 1150, as shown in FIG. 11(a). In order to ascertain the relevance of the documents 600 during a query handling operation, the indexing engine preferably obtains statistical information about the words in the documents. This statistical information may include a count of the number of times a particular word appears in a document and a count of the number of times a particular word appears in the entire document collection (should the documents 600 be grouped into one or more collections). Another parameter that can be determined and used for relevance assessments is the size (in words or bytes) of each document. By knowing these parameters, the relevance of a document retrieved during querying can be calculated using well-known probabilistic relevance models such as the Okapi BM25 model. See Karen Spärck Jones, Steve Walker, and Stephen E. Robertson. "*A Probabilistic Model of Information Retrieval: Development and Comparative Experiments* (parts 1 and 2).", Information Processing and Management, 36(6):779-840. 2000, the entire disclosure of which is incorporated herein by reference.

Through a word counting module 1150, word lists for documents and document collections are generated as the words stream therethrough. Associated with each word on the list will be a count value that is incremented each time the associated word is encountered in the stream. FIG. 11(*b*) depicts an exemplary index 1154 wherein the pointers 106 include a word count parameter wc that identifies how many times each term appears in the referenced document. These pointers may also include parameters that identify the size of each document (although this information can be maintained in a separate index table). Table 1154 may also include an additional column 1160 that includes a "collection count" parameter that identifies how many times each term appears in a document collection. Appropriate flags can be added to the bits in the word and position vector stream to identify collection separations. Because the output from the word counting module preferably includes this count information, FIG. 11(*a*) depicts the output from the word counting module 1150 as including count vectors.

Another metadata generation operation 604 that can be performed by coprocessor 450 is a classification operation 1100. An exemplary pipeline for such actions is shown in FIG. 11(*c*). An example of a document classification operation that can be performed on documents includes language classification. With language classification, the document can be applied to a statistical n-gram algorithm that is configured to identify the language that the text within the document most closely matches. See William B. Cavnar and John M. Trenkle, "*N-Gram-Based Text Categorization*", Proceedings of SDAIR-94, 3rd Annual Symposium on Document Analysis and Information Retrieval, Las Vegas, pages 161-175, 1994, the entire disclosure of which is incorporated herein by reference. Other document classification operations may employ hidden Markov models (HMMs) to learn some type of classification for the document. See Ludovic Denoyer, Hugo Zaragoza and Patrick Gallinari, "*HMM-based Passage Models for Document Classification and Ranking*", Proceedings of ECIR-01, 23rd European Colloquium Information Retrieval Research, Darmstatd, DE, pages 126-135, 2001, the entire disclosure of which is incorporated herein by reference.

Figure 12A:
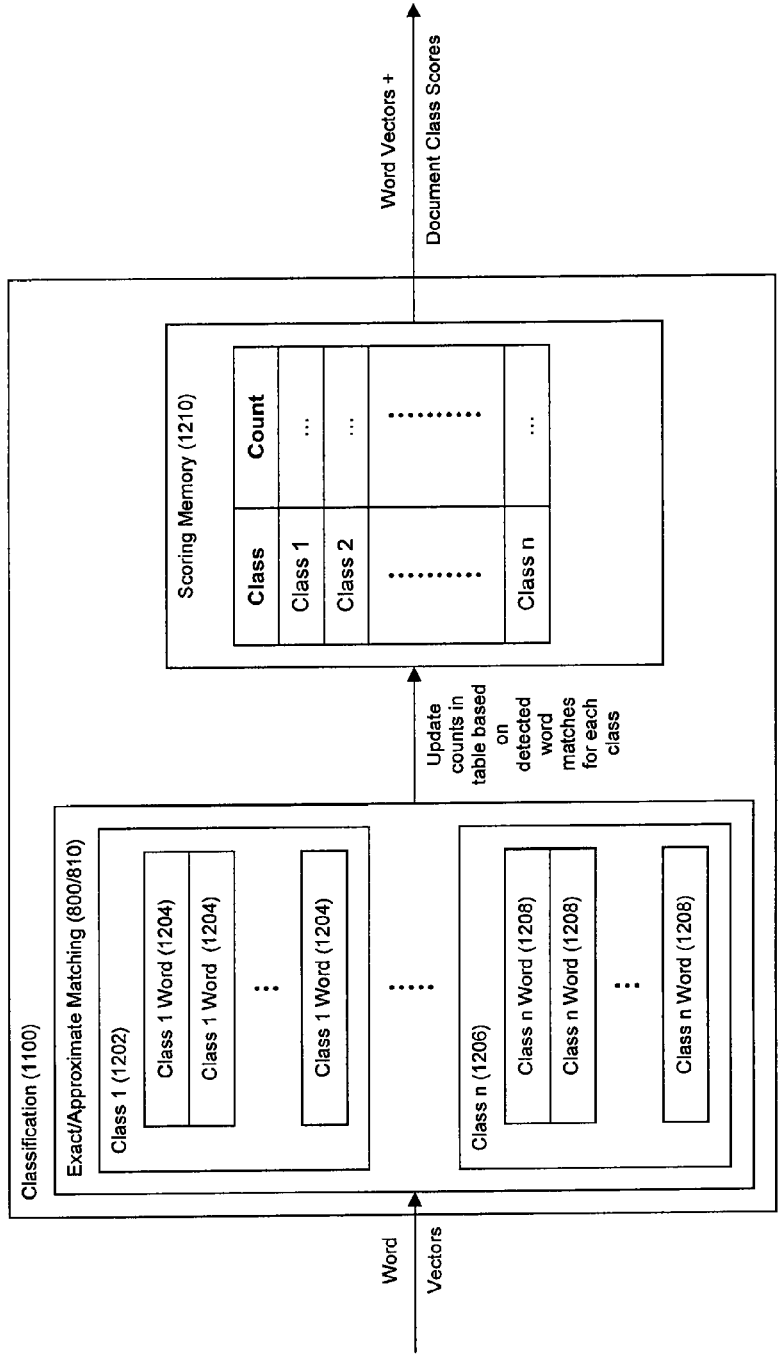
FIG. 12(a) depicts an exemplary classification operation that produces class scores for incoming documents to assess their relevance to a plurality of different classifications.
Figure 12B:
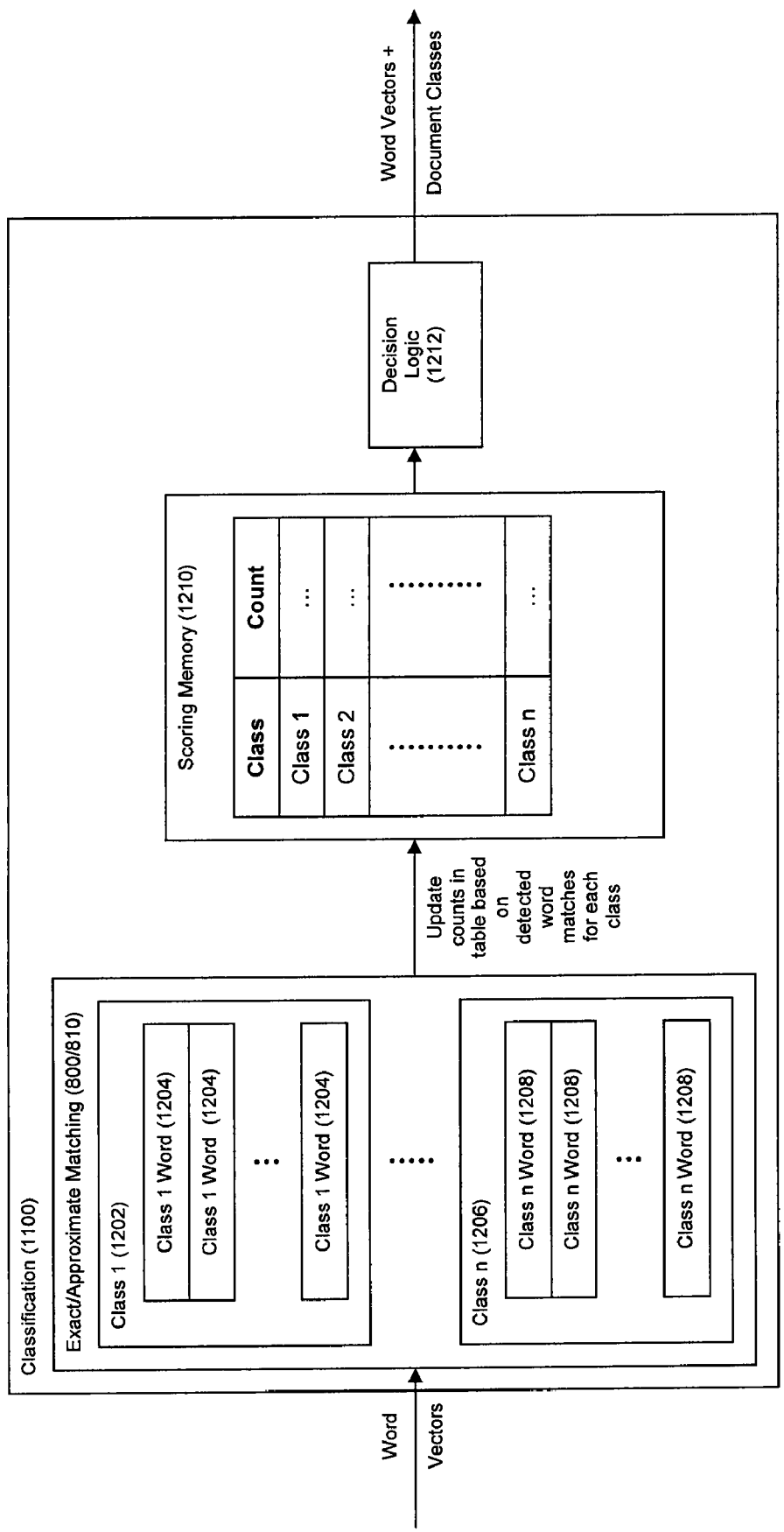
FIG. 12(b) depicts an exemplary classification operation that determines a classification for each incoming document.

FIG. 12(*a*) depicts an exemplary classification operation wherein a list of words is maintained for a plurality of different classes. For example, a first class 1202 is associated with words 1204 and so on such that class n 1206 is associated with words 1208. These words can be used by one or more matching modules 800/810 as keys that are compared against incoming words. As the key words find a match to a word within a document, a scoring memory 1210 that tracks a count of matches for each class can be updated as appropriate. Thus, when the matching module 800/810 finds a match between a given word within Document X and a word 1204 within the first class 1202, then the "count" field for class 1 in the scoring memory 1210 associated with that document can be updated. These counts can serve as class scores for each document to thereby indicate how relevant a given document is to a particular class. Preferably, the scoring memory 1210 is refreshed upon encountering a new document in the word stream. Scoring memory 1210 is preferably maintained in the available on-chip memory of the FPGA 402 or in memory device 702 (see FIGS. 3(*a*) and (*b*)).

The different classes can pertain to classifications such as "news", "sports", "legal", "medicine", etc. The words within each class can be words that are generally expected to be found in a document that pertains to the subject defined by the class. For example, the word "baseball" may be present in the word list for a "sports" classification, and the word "estop" may be present in the word list for a "legal" classification.

Another exemplary document classification can be language classification. In such an application, each class shown in FIG. 12(*a*) can be associated with a different language, wherein the words within each class would comprise a full (or redacted) dictionary for that language. With reference to the embodiment of FIG. 9(*a*), it can be understood that such language classification operations can function as an adjunct to specialized indexing, wherein the matching operations shown in FIG. 9(*a*) can also operate to update a scoring memory 1210 as appropriate. Yet another exemplary document classification can be "reading comprehension level". Each class can be associated with a different comprehension level (e.g., "$5^{th}$ grade reading level", "high school freshman reading level", "undergraduate reading level", etc.), and the words within each class can be words expected to be encountered in documents belonging to the corresponding comprehension level. It should be noted that the count vector information produced by the word counting module of FIG. 11(*a*) may be helpful in aiding classifications such as "comprehension level".

FIG. 12(*b*) depicts an exemplary classification embodiment wherein decision logic 1212 is employed to assign one or more classes to a document based on the class counts for that document as recorded by scoring memory 1210. For example, each class can have an associated threshold value. If the class count meets or exceeds the threshold value for its class, then the document can be tagged as belonging to that class. As such, it may be possible for the same document to belong to multiple classes should its counts in those classes meet or exceed the classes' assigned threshold values.

Furthermore, it should be noted that one or more regular expression matching modules 910 can be advantageously employed in connection with classification operation 1100 (possibly in combination with one or more matching modules 800/810). For example, if a document is found to contain a credit card number, then an inference could possibly be drawn that the document should be classified as a "sales record", "personal record", or the like. Regular expression matching can also be useful to generate counts of how many words have particular character lengths. For example, the regular expression "xxxx" where x can be any character can be used to update a count of 4 letter words, while the regular expression "xxxxx" can be used to update a count of 5 letter words, and so on. Such word length counts can be useful for assessing classifications such as "comprehension level" discussed above.

The classification module 1100 may be used to enrich the word stream emanating from the module 1100 by adding bit strings for each document to the stream, wherein each bit string tags each document as belonging to a particular class. For example, if the classification module is configured to determine which of 20 classifications a document belongs to, a 20 bit string can be added to the output stream for each document, wherein each bit is associated with a particular classification and flags whether the document belongs to that classification. As such, bit X in this bit string can be set aside to flag whether the document contains a credit card number. Thus, if a regular expression matching module 910 detects the presence of a credit card number pattern within a document, the bit string for that document can be updated to set bit X to high. Similarly, bit Y in the bit string can be set aside to flag whether the document is a legal document. If the classification operation results in a determination that the document should be considered a legal document, then bit Y can be set to high.

It should also be noted that classification operation 1100 can be considered as also belonging to the specialized index generation category of metadata generation operations because the classification information produced by classification operation 1100 can also be used to generate specialized indexes of documents by class. Such indexes can serve as powerful searching aids in that they can be used to answer questions such as "How many Spanish language documents are within the enterprise?" and conduct research such as "What relationships exist between sports and medicine?" and "Find all legal documents in which John Smith is mentioned".

Also, it should be noted that the classification operation can be performed in software (e.g., software executed by processor 412) using the general and specialized indexes generated from embodiments such as those shown in FIGS. 9(a)-(c). These different indexes can be cross-correlated with pre-defined word lists for the different classes to determine the classification information for each document.

With reference to FIG. 13(a), and following from FIG. 11(a), another metadata generation operation 604 that can be performed by coprocessor 450 is a histogram generation operation 1300 to thereby aid document clustering. With document clustering, it is desired to know the relevance of different documents to each other. To aid such clustering determinations, the coprocessor 450 can be configured to perform the histogram generation operation 1300 on documents 600 (wherein this operation can be similar if not identical to the word counting operation described above). These histograms can identify the frequency of words within a document. From the generated histograms, software can be used to perform feature vector expansion and identify document clusters (operation 1302) that are likely related to each other with respect to common subject matter, etc. Feature vector expansion is a standard technique wherein the feature vectors of individual documents are expanded to include words from all the documents in the collection. Clustering can be performed using any of the well-known techniques such as K-means clustering, fuzzy C-means clustering, hierarchical clustering, etc. See M. Steinbach, G. Karypis, and V. Kumar. "*A comparison of document clustering techniques.*", KDD Workshop on Text Mining, 2000, the entire disclosure of which is incorporated herein by reference.

Should the stream pre-processing module 602 already employ word counting, then the histogram generation stage 1300 can be omitted, as shown in FIG. 13(b).

It should be noted that the clustering operations shown by FIGS. 13(a) and (b) can be considered as also belonging to the specialized index generation category of metadata generation operations because the clustering information can also be used to generate specialized indexes of documents by clusters. Such indexes can serve as powerful searching aids in that they can be used to answer questions such as "Which documents within an enterprise are similar to Document X?" and "Which books available for sale from this website are similar to Book X?".

FIGS. 14(a) and (b) depict exemplary pipelines wherein the hardware-accelerated metadata generation operation 604 includes classification 1100, specialized index generation 850, and histogram generation 1300 (or word counting 1150).

Figure 15:
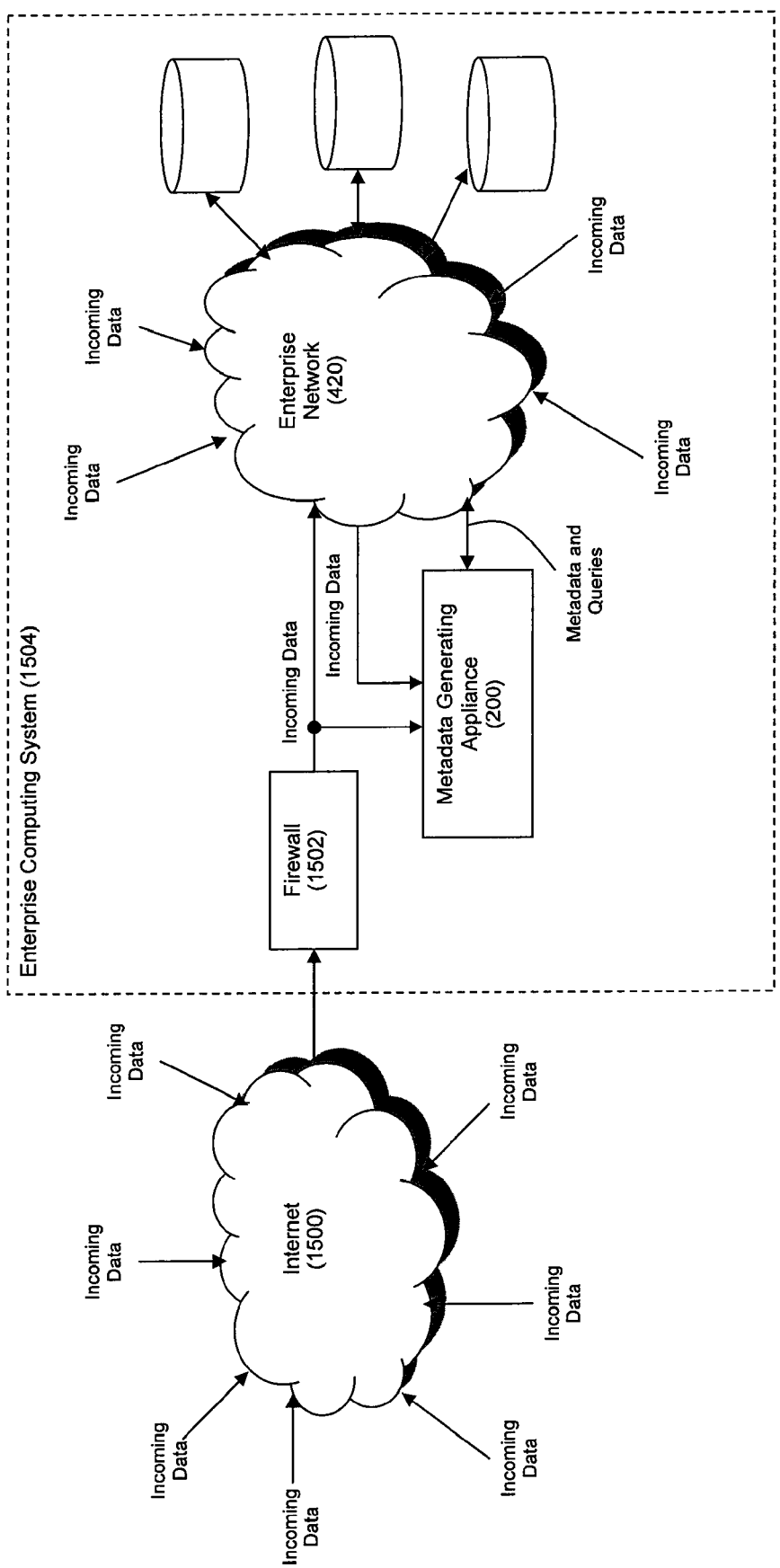
FIG. 15 depicts an exemplary environment in which the appliance of FIGS. 2(a)-(c) can be employed.

FIG. 15 depicts an exemplary environment in which appliance 200 can be effectively employed. FIG. 15 depicts an enterprise computing system 1504 that receives a large volume of incoming data from the Internet 1500. After this incoming data passes enterprise firewall 1502, it can be streamed through appliance 200 which taps into the firewall output. Appliance 200 can thus be used to generate metadata and indexes for the incoming data as that data reaches the enterprise and before it lands in data storage somewhere within enterprise network 420. The data processed by appliance 200 can also include data originating from within the enterprise computing system 1504. Furthermore, appliance 200 can optionally be configured to output its generated metadata for delivery to other repositories within enterprise network 420. Further still, queries can optionally be applied to appliance 200 to conduct full-text searching or other data analysis operations on data indexed by appliance 200. As noted, an example of such a use for appliance 200 is disclosed in the above-referenced and incorporated U.S. patent application Ser. No. 11/938,709, filed this same day, entitled "Method and System for High Performance Integration, Processing and Searching of Structured and Unstructured Data Using Coprocessors".

Figure 16:
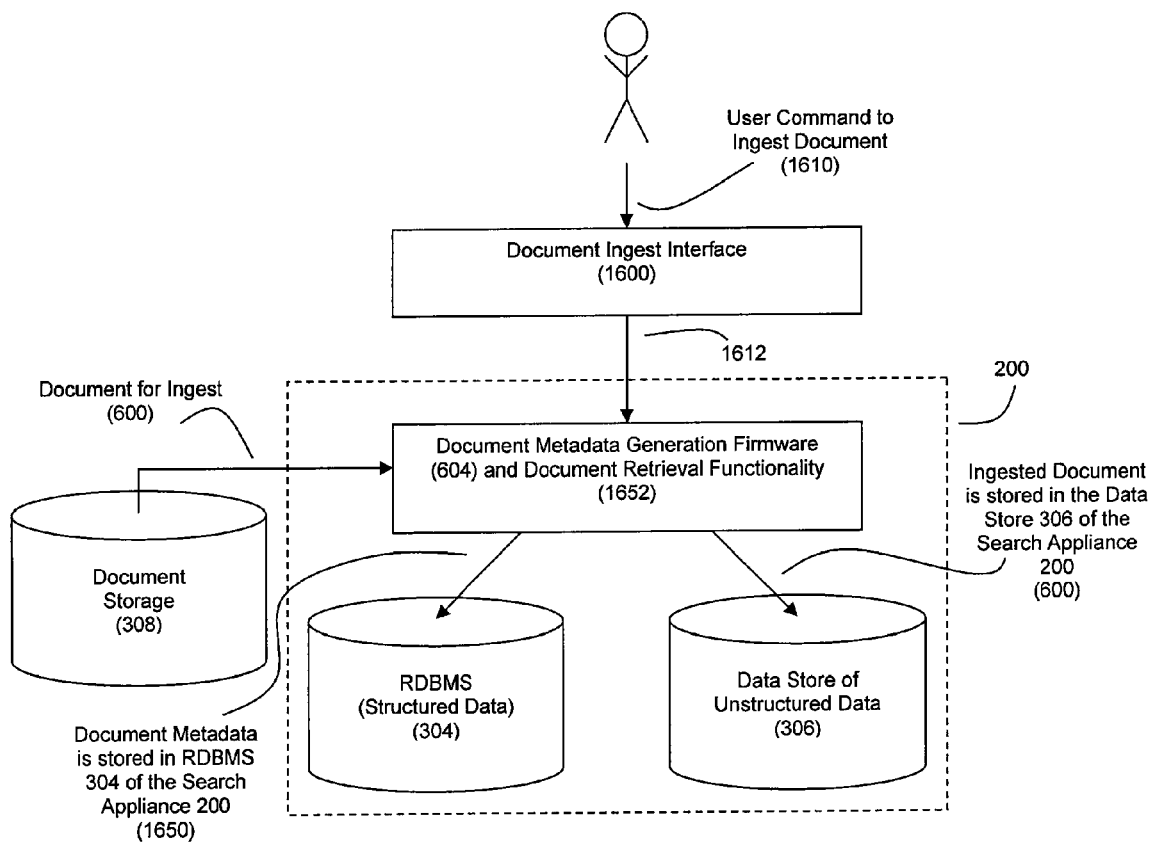
FIG. 16 illustrates an exemplary overview of a document ingest pre-processing operation that can employ the metadata generation techniques described herein.

FIG. 16 depicts an overview of document ingest pre-processing in accordance with an embodiment where appliance 200 is used to index documents within an enterprise. Preferably, through some form of document ingest GUI 1600 displayed on a user computer within enterprise network 420, the user is able to specify which document(s) should be ingested into data store 306 of FIG. 2(c). Optionally, the user can also key in various forms of metadata about the document(s) to be ingested; however this need not be the case as the coprocessor 450 will be arranged to perform the desired metadata generation operations automatically, as described above. In response to an appropriate command 1612 delivered to appliance 200 from GUI 1600, one or more documents 600 stored in a data store 308 accessible through the enterprise network 420, but external to the appliance 200, is delivered to the appliance 200. Various adapters can be employed in document retrieval functionality 1652 employed by the appliance 200 to provide access to documents stored on common file systems such as NTFS, FAT, CIFS, various flavors of Unix file systems, as well as Web access over HTTP.

Should the coprocessor employ a reconfigurable logic device 402 with firmware 350 deployed thereon, FAMs resident in firmware pipeline 350 will be arranged to perform a document metadata generation operation on the documents it receives. Examples of these metadata generation operations are described above.

The document metadata 1650 that is produced by the operation of firmware 350 can then be stored in RDBMS 304, wherein the RDBMS engine operates to generate and maintain an index of this document metadata that can later be queried using standardized database queries to identify which documents within data store 306 should be processed through the coprocessor 450 at hardware speeds during query processing. After the received document 600 has been processed by firmware 350, document 600 can then be ingested into the appliance by storing it in the data store 306 of unstructured data. The acts of metadata generation and document ingestion preferably operate virtually concurrently in near-real time. It should be noted that the document metadata 1650 can optionally be stored in a structured database external to the appliance 200.

Figure 17:
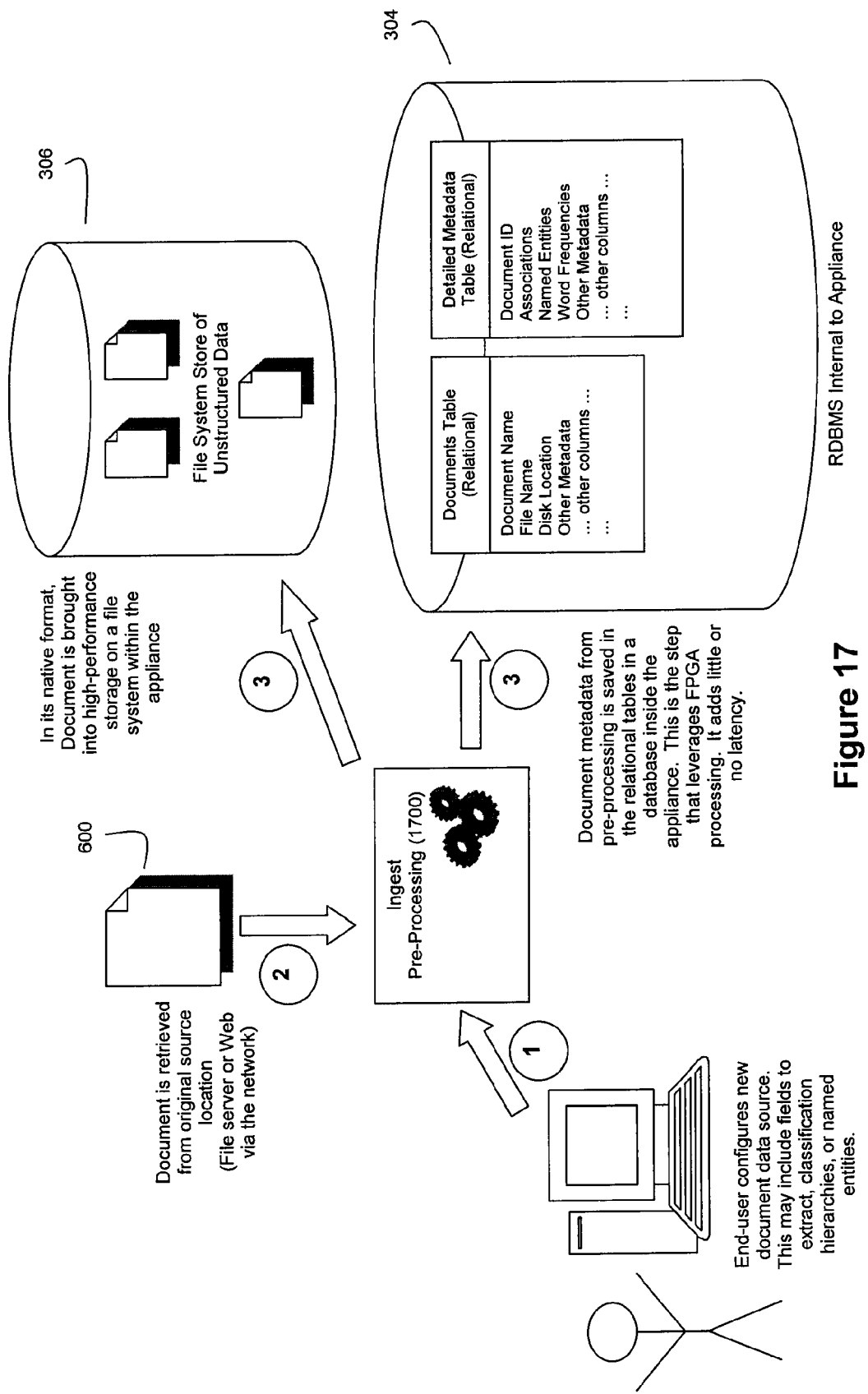
FIG. 17 illustrates an exemplary logical view of a document ingest pre-processing operation in accordance with the FIG. 2(c) embodiment.
Figure 18:
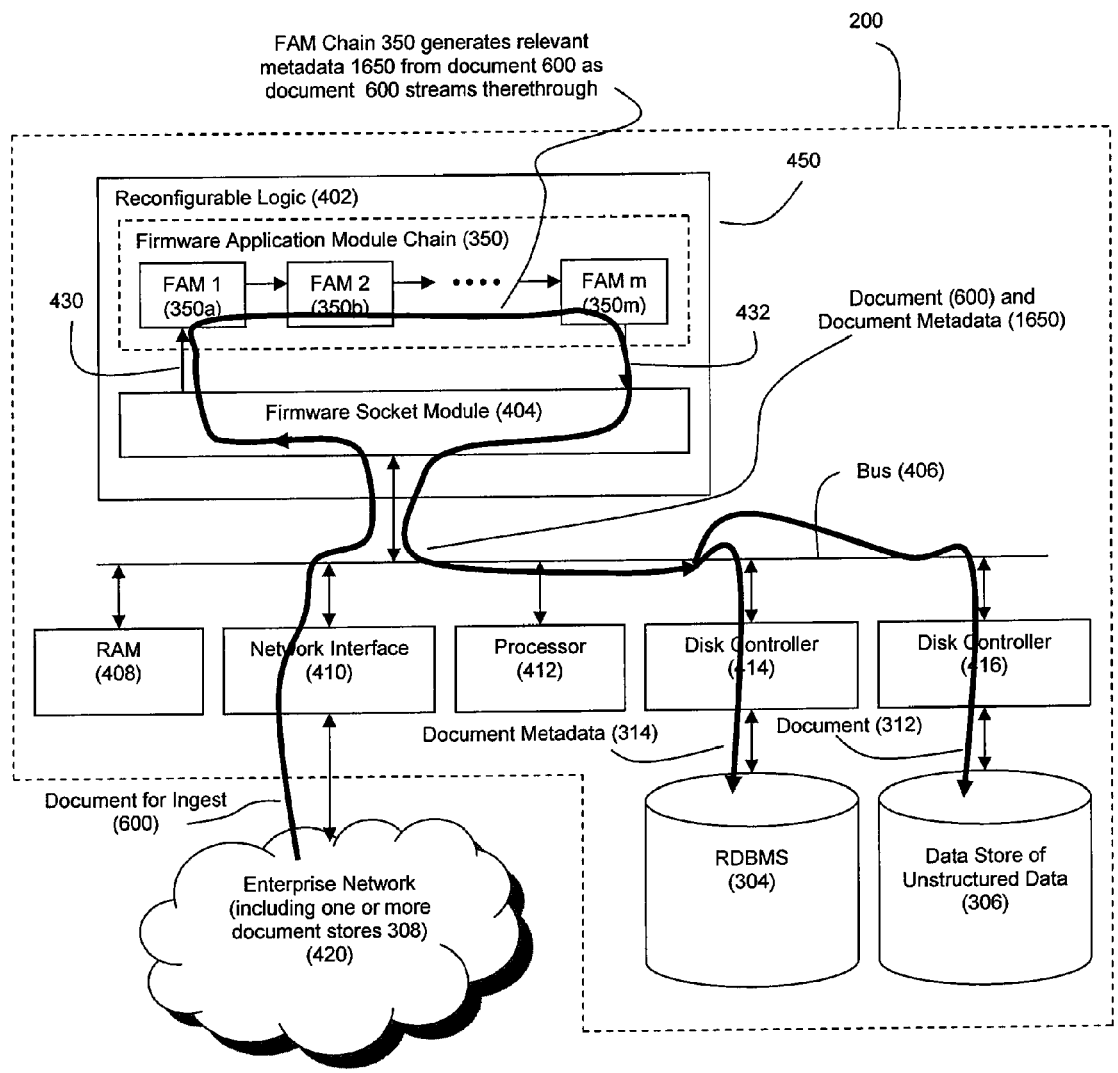
FIG. 18 illustrates an exemplary data flow within the appliance of FIG. 2(c) for a document ingest pre-processing operation that can employ the metadata generation techniques described herein.

FIG. 17 depicts this document ingest pre-processing 1700 as a logical flow. At step 1, the user interacts with GUI 1600 to identify a new document 600 for ingestion into appliance 200. GUI 1600 may optionally be configured to allow the user to specify what metadata is to be generated from document 600. Next, at step 2, the document 600 is retrieved from its original source location (either an enterprise document store 308, the Internet or some other network that is accessible to the enterprise network 420). Then, firmware 350 performs its document metadata generation operation 604 on document 600 to produce document metadata 1650. At step 3, the document 600 is then stored in the file system of data store 306, and the document metadata (including its location in the file system of data store 306) is saved into relational tables of the RDBMS 304. FIG. 18 illustrates this data flow superimposed over the appliance 200 of FIG. 2(*c*).

In this manner, appliance 200 can now use the document metadata 1650 indexed by RDBMS 304 to aid decisions as to which documents should be subjected to a query-specified data processing operation (e.g., a full-text searching operation) via coprocessor 450. Furthermore, because standardized RDBMS technology has been leveraged within appliance 200, standardized database queries that are well-known to a number of users can be used to decide which documents are to be subjected to the coprocessor-based data processing operation when processing a given query. This type of query processing is disclosed in the above-referenced and incorporated U.S. patent application Ser. No. 11/938,709, filed this same day, entitled "Method and System for High Performance Integration, Processing and Searching of Structured and Unstructured Data Using Coprocessors".

While in the preferred embodiment disclosed herein the coprocessor 450 comprises a reconfigurable logic device 402 such as an FPGA, it should be noted that the coprocessor 450 can be realized using other processing devices. For example, the coprocessor 450 may comprise graphics processor units (GPUs), general purpose graphics processors, chip multi-processors (CMPs), dedicated memory devices, complex programmable logic devices, application specific integrated circuits (ASICs), and other I/O processing components. Moreover, it should be noted that appliance 200 may employ a plurality of coprocessors 450 in either or both of a sequential and a parallel multi-coprocessor architecture.

While the present invention has been described above in relation to its preferred embodiments, various modifications may be made thereto that still fall within the invention's scope. Such modifications to the invention will be recognizable upon review of the teachings herein. Accordingly, the full scope of the present invention is to be defined solely by the appended claims and their legal equivalents.

What is claimed is:

1. An apparatus comprising:
a reconfigurable logic device for communication with a processor, the reconfigurable logic device having a firmware pipeline deployed thereon, the firmware pipeline comprising a plurality of firmware application modules, at least one of the firmware application modules comprising a regular expression pattern matching module, and at least another of the firmware application modules comprising an exact or approximate matching module, the firmware pipeline configured to, at a hardware rate,
(1) receive a stream of data objects,
(2) tag each data object with a data object identifier,
(3) parse the data objects into a plurality of words,
(4) tag the words with a plurality of position identifiers,
(5) perform a regular expression pattern matching operation via the regular expression pattern matching module to detect whether any pattern matches exist between the streaming data objects and at least one pattern,
(6) perform an exact or approximate matching operation via the exact or approximate matching module to detect whether any exact or approximate matches exist between the streaming data objects and a plurality of words in a dictionary,
(7) concurrently generate multiple types of indexes for the streaming data objects, the multiple indexes comprising a general index, at least one pattern index based on the detected pattern matches, and at least one dictionary index based on the detected exact or approximate matches, the indexes comprising a plurality of terms and pointers, wherein each pointer is associated with a data object and a term, wherein each pointer comprises a data object identifier and a position identifier for a word within a data object that matches a term in an index, and
(8) as data object identifiers, position identifiers, pattern matches, and exact or approximate matches continue to be generated for the streaming data objects, update the indexes based thereon such that a new pointer to a given data object is added to an index when the term associated with the new pointer is found within the given data object.

2. The apparatus of claim 1 further comprising the processor, the processor being in communication with the reconfigurable logic device via a bus, wherein the processor is configured to control delivery to the reconfigurable logic device of the data objects and commands for configuring the reconfigurable logic device.

3. The apparatus of claim 1 wherein the firmware pipeline is further configured to generate and update the indexes by performing a hashing operation on the data object identifiers and position identifiers corresponding to the detected pattern matches and the detected exact or approximate matches.

4. The apparatus of claim 1 wherein the reconfigurable logic device comprises resident memory for storing the indexes.

5. The apparatus of claim 4 further comprising an RDBMS in communication with the reconfigurable logic device via a bus, and wherein the reconfigurable logic device is further configured to merge the indexes into a plurality of operational indexes maintained by the RDBMS.

6. The apparatus of claim 1 wherein the exact or approximate matching operation comprises an approximate matching operation.

7. The apparatus of claim 1 wherein the firmware pipeline further comprises:
a plurality of the regular expression pattern matching modules in parallel, each of the regular expression pattern matching modules being configured to detect a different pattern within the streaming data objects;
a plurality of the exact or approximate matching modules in parallel, each of the exact or approximate matching modules being configured to detect an exact or approximate match within the streaming data objects with respect to a plurality of words in a plurality of different dictionaries; and
wherein the reconfigurable logic device is further configured to (1) process the streaming data objects through the regular expression pattern matching modules and the exact or approximate matching modules in parallel, (2) generate the general index based on the data object identifiers and the position identifiers for the streaming data objects, (3) generate and update a plurality of the pattern indexes based on the pattern matches found by the parallel regular expression pattern matching modules such that each pattern index corresponds to a different one of the patterns, and (4) generate and update a plurality of the dictionary indexes based on the exact or approximate matches found by the parallel exact or approximate matching modules such that each dictionary index corresponds to a different one of the dictionaries.

8. The apparatus of claim 1 wherein the reconfigurable logic device comprises a field programmable gate array (FPGA).

9. The apparatus of claim 1 further comprising the processor, wherein the processor comprises a general purpose processor (GPP).

10. The apparatus of claim 1 wherein at least one of the patterns comprises a credit card number.

11. The apparatus of claim 1 wherein at least one of the patterns comprises a social security number.

12. The apparatus of claim 1 wherein at least one of the patterns comprises an email address.

13. The apparatus of claim 1 wherein at least one of the patterns comprises a telephone number.

14. The apparatus of claim 1 wherein at least one of the patterns comprises an Internet uniform resource locator (URL).

* * * * *